US011594056B2

(12) United States Patent
Wakui

(10) Patent No.: US 11,594,056 B2
(45) Date of Patent: Feb. 28, 2023

(54) LEARNING APPARATUS, OPERATION PROGRAM OF LEARNING APPARATUS, AND OPERATION METHOD OF LEARNING APPARATUS

(71) Applicant: FUJIFILM Corporation, Tokyo (JP)

(72) Inventor: Takashi Wakui, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 60 days.

(21) Appl. No.: 17/201,639

(22) Filed: Mar. 15, 2021

(65) Prior Publication Data

US 2021/0201017 A1    Jul. 1, 2021

Related U.S. Application Data

(63) Continuation of application No. PCT/JP2019/028077, filed on Jul. 17, 2019.

(30) Foreign Application Priority Data

Sep. 28, 2018    (JP) .............................. JP2018-184404

(51) Int. Cl.
*G06V 30/413*    (2022.01)
*G06K 9/62*    (2022.01)
(Continued)

(52) U.S. Cl.
CPC ......... *G06V 30/413* (2022.01); *G06K 9/6217* (2013.01); *G06V 30/194* (2022.01); *G06V 30/274* (2022.01)

(58) Field of Classification Search
CPC combination set(s) only.
See application file for complete search history.

(56) References Cited

U.S. PATENT DOCUMENTS 8,175,376 B2 *  5/2012  Marchesotti ........ G06F 16/5838
                                                                 382/282
9,642,245 B2 *  5/2017  Iwami ..................... G06F 3/044
(Continued)

FOREIGN PATENT DOCUMENTS

JP         2012-43151 A      3/2012

OTHER PUBLICATIONS

International Preliminary Report on Patentability and Written Opinion of the International Searching Authority for International Application No. PCT/JP2019/028077, dated Apr. 8, 2021, with an English translation.

(Continued)

*Primary Examiner* — Tahmina N Ansari
(74) *Attorney, Agent, or Firm* — Birch, Stewart, Kolasch & Birch, LLP

(57) ABSTRACT

A learning apparatus learns a machine learning model for performing semantic segmentation of determining a plurality of classes in an input image in units of pixels by extracting, for each layer, features which are included in the input image and have different frequency bands of spatial frequencies. A learning data analysis unit analyzes the frequency bands included in an annotation image of learning data. A learning method determination unit determines a learning method using the learning data based on an analysis result of the frequency bands by the learning data analysis unit. A learning unit learns the machine learning model via the determined learning method using the learning data.

13 Claims, 28 Drawing Sheets

(51) Int. Cl.
    *G06V 30/194*     (2022.01)
    *G06V 30/262*     (2022.01)

(56) References Cited

U.S. PATENT DOCUMENTS

| | | | |
|---|---|---|---|
| 10,522,186 B2* | 12/2019 | Attorre | G10L 17/00 |
| 2012/0045095 A1 | 2/2012 | Tate et al. | |
| 2014/0111711 A1* | 4/2014 | Iwami | B32B 15/02 |
| | | | 349/12 |
| 2019/0035431 A1* | 1/2019 | Attorre | G11B 27/34 |
| 2021/0201017 A1* | 7/2021 | Wakui | G06T 7/11 |

OTHER PUBLICATIONS

International Search Report for International Application No. PCT/JP2019/028077, dated Oct. 8, 2019, with an English translation.
Ronneberger et al., "U-Net: Convolutional Networks for Biomedical Image Segmentation," [online], May 18, 2015, <URL: https://arxiv.org/abs/1505.04597v1> and <URL: https://arxiv.orgpdf/1505.04597v1.pdf>, 14 pages total.

\* cited by examiner

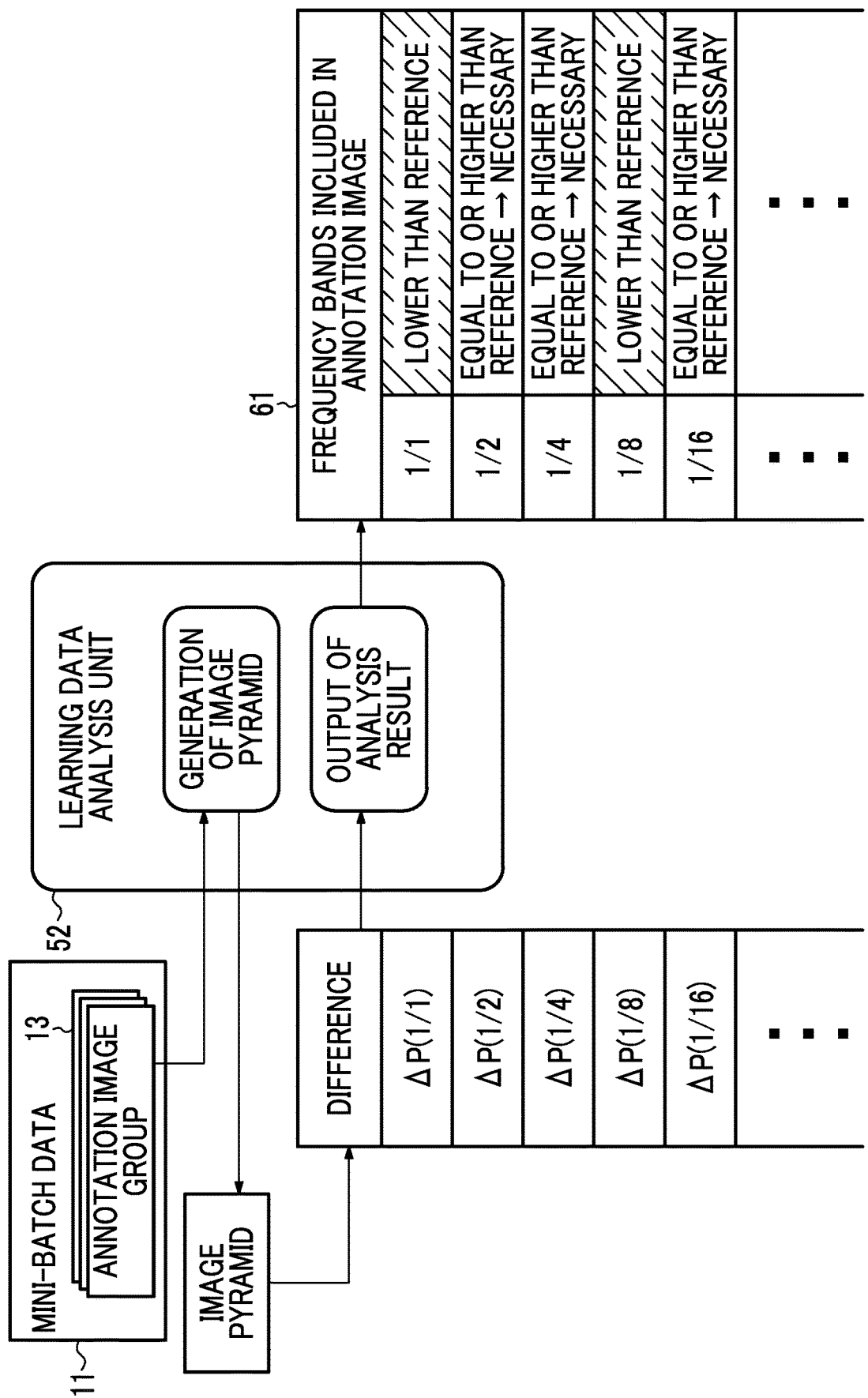

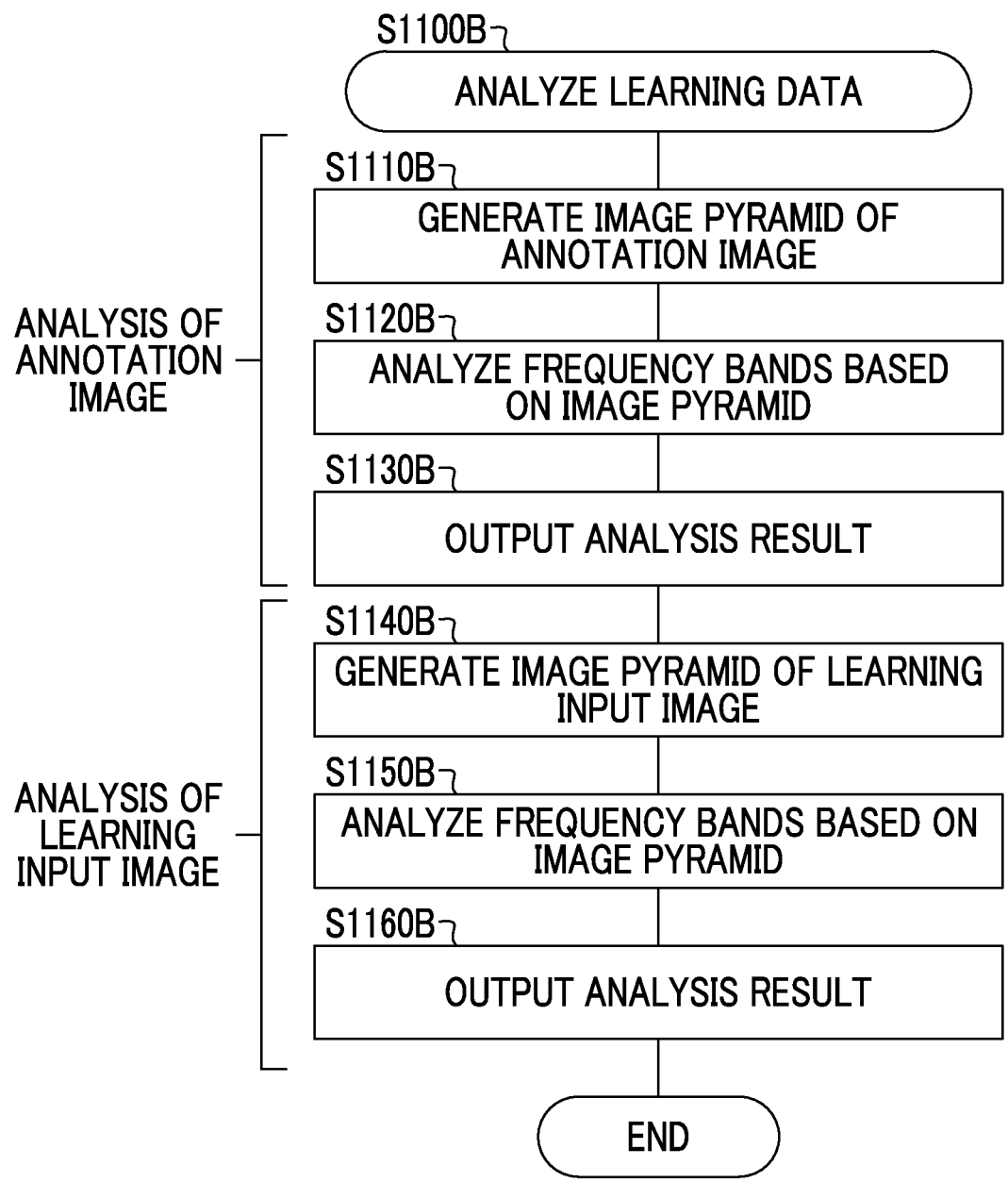

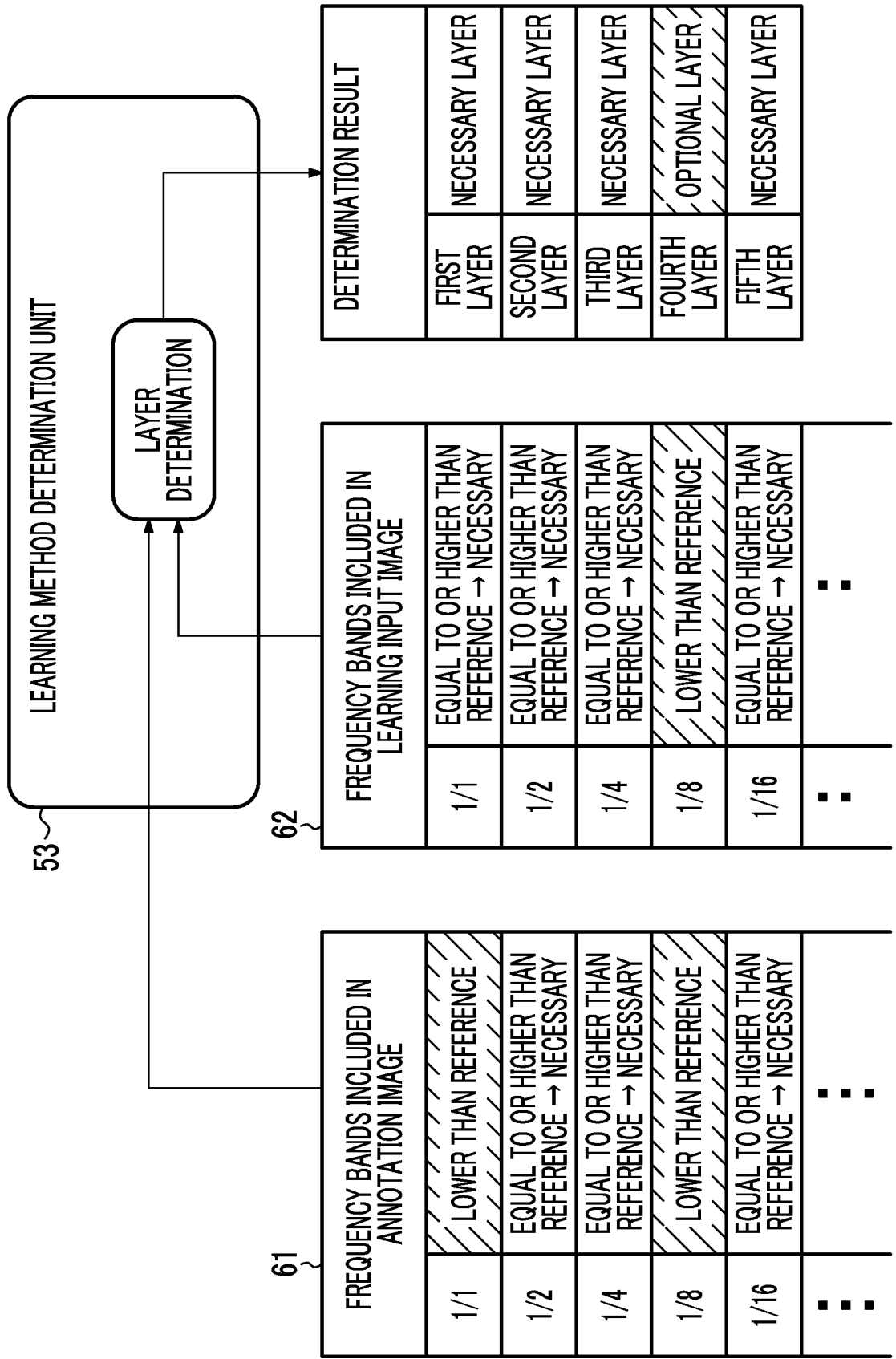

LEARNING APPARATUS, OPERATION PROGRAM OF LEARNING APPARATUS, AND OPERATION METHOD OF LEARNING APPARATUS

CROSS-REFERENCE TO RELATED APPLICATIONS

This application is a Continuation of PCT International Application No. PCT/JP2019/028077 filed on Jul. 17, 2019, which claims priority under 35 U.S.C § 119(a) to Japanese Patent Application No. 2018-184404 filed on Sep. 28, 2018. Each of the above application(s) is hereby expressly incorporated by reference, in its entirety, into the present application.

BACKGROUND OF THE INVENTION

1. Field of the Invention

The technique of the present disclosure relates to a learning apparatus, an operation program of the learning apparatus, and an operation method of the learning apparatus.

2. Description of the Related Art

In recent years, a machine learning model that realizes semantic segmentation by analyzing an input image using a neural network has been known. The semantic segmentation is a technique of determining a plurality of classes included in the input image in units of pixels and outputting an output image in which regions are divided for each determined class.

The class is, for example, a type of an object that appears in the input image. In short, the semantic segmentation is a technique of determining a class and a contour of an object appearing in an image and outputting a determination result as an output image. For example, in a case where three objects of a cup, a book, and a mobile phone appear in an image, in an output image, ideally, each of the cup, the book, and the mobile phone is determined as a class, and a region defined by a contour line which faithfully traces a contour of the object is distinguishably presented for each class.

As a machine learning model for performing the semantic segmentation, a hierarchical machine learning model (hereinafter, simply referred to as a hierarchical model) is used, the hierarchical model being a model that includes a plurality of layers for analyzing the input image and extracts, for each layer, features which are included in the input image and have different frequency bands of spatial frequencies. As the hierarchical model, for example, a convolutional neural network (CNN) such as a U-shaped neural network (U-Net) is known. Hereinafter, unless otherwise stated, the frequency bands mean frequency bands of spatial frequencies.

In the hierarchical model, convolution processing of extracting an image feature map representing features of the input image is performed by inputting input data in which a plurality of pixel values are two-dimensionally arranged for each layer to the model, applying a filter to the input data, and performing convolution on pixel values of adjacent pixels which are adjacent to each other. As the input data, the input image to be analyzed is input to the highest layer, which is a first layer among the plurality of layers. The features represented by the pixel values of the adjacent pixels in the input image are features of the finest structure. For this reason, performing convolution processing of the pixel values of the adjacent pixels on the input image corresponds to extracting the features of the fine structure having the highest frequency band in the input image.

In each layer, after convolution processing is performed, pooling processing of outputting the image feature map having a reduced image size is performed by calculating local statistics of the extracted image feature map and compressing the image feature map. In the next layer, the reduced image feature map is input as input data, and the convolution processing and the pooling processing are repeated.

In this way, from the higher layer to the lower layer, in the input data which is input to each layer, the image size is gradually reduced, and as a result, a resolution is lowered. For example, in the middle layers, the image feature maps having image sizes corresponding to ½ to ¼ of the input image are input, and in the lower layers, the image feature maps having image sizes corresponding to ⅛ to 1/16 of the input image are input.

Even in the middle layers and the lower layers, in order to extract the features of the input image, convolution processing of the pixel values of the adjacent pixels is performed by applying a filter to the input image feature map. However, in the image feature map having a resolution lower than the resolution of the input image, considering pixel positions in the input image, even in a case of the adjacent pixels, the adjacent pixels are spatially separated from each other. For this reason, as the layer is lower, features of a coarse structure having a low frequency band in the input image are extracted.

In this way, in the hierarchical model, features which are included in the input image and have different frequency bands are extracted by using the plurality of layers. The classes which are included in the input image and are to be determined may have various frequency bands. By extracting the features having different frequency bands for each layer, the classes which are included in the input image and have various frequency bands can be determined.

JP2012-043151A discloses a hierarchical model using a convolutional neural network used for image analysis, although the hierarchical model is not related to semantic segmentation.

SUMMARY OF THE INVENTION

In the hierarchical model for performing semantic segmentation, in order to improve a class determination accuracy, learning based on learning data is performed. The learning data includes a pair of a learning input image similar to the input image and an annotation image in which each class region included in the learning input image is indicated by an annotation. The annotation image is an image in which each class region is manually designated on the learning input image using a pen tablet or the like. The annotation image is a correct answer image indicating a correct answer of the determination result of the class included in the corresponding learning input image.

Learning is performed by inputting the learning data to the hierarchical model. Specifically, the learning input image is input to the hierarchical model, and the learning output image, which is a determination result of the learning input image which is input, is output. By comparing the learning output image and the annotation image corresponding to the learning input image, the class determination accuracy is evaluated. The hierarchical model is updated according to the evaluation result.

However, in learning of the hierarchical model, in a case where the frequency bands of the classes to be determined in the learning data and the frequency bands that the hierarchical model is capable of analyzing do not match, there are the following problems. A first problem is that the class is not appropriately determined in learning, and a second problem is that calculation processing in learning is wasteful. In a case where calculation processing is wasteful, as a result, a consumption of a resource such as a memory and a calculation time are also wasted.

One of causes of such a problem is related to a method of designating the class region of the annotation image included in the learning data. The class region of the annotation image is designated, for example, by manually coloring the class region and adding an annotation to the class region. The class region is manually colored by a person, and as a result, even in the same class, there is a variation in fineness of coloring. For example, there may be an annotation image in which the class regions are finely colored in units of one pixel, or there may be an annotation image in which the class regions are coarsely colored in units of two pixels to four pixels. That is, fineness of coloring differs depending on the annotation image.

In a case where the coloring is fine, the feature indicating the class in the image has a high frequency band. In a case where the coloring is coarse, the feature indicating the class in the image has a low frequency band. In the annotation image, in a case where most of the classes to be determined have a low frequency band, in the hierarchical model, there may be a case where the processing of extracting the fine structure in the higher layer is unnecessary. In this case, an unnecessary layer, which does not contribute to improvement of the determination accuracy of the class included in the learning data which is input, is included in the hierarchical model. This is an example of a case where the frequency bands of the classes to be determined in the learning data and the frequency bands that the hierarchical model is capable of analyzing are mismatched. The mismatching causes the above-described second problem.

In addition, of course, a range of the frequency bands that the hierarchical model is capable of analyzing is finite. In the hierarchical model, a reduction rate for reducing the image size from the highest layer to the lowest layer is preset. For example, in a case where the input image is input in the highest layer at the equal magnification (1/1) and the input data having an image size of $1/16$ of the input image is input in the lowest layer, the reduction rate is $1/16$. For this reason, in a case where the resolution of the input image which is input to the highest layer is too high, even in the lowest layer, there may be a case where the features of a coarse structure which are included in the input image and have a low frequency band cannot be extracted. This is also an example of a case where the frequency bands of the classes to be determined in the learning data and the frequency bands that the hierarchical model is capable of analyzing are mismatched. The mismatching causes the above-described first problem.

The first problem in that the class is not appropriately determined in learning affects a learning effect of the hierarchical model, and as a result, in an operation phase, the class determination accuracy is affected. Further, because the learning of the hierarchical model is repeatedly performed based on a large amount of learning data, the second problem in that calculation processing in learning is wasteful cannot be ignored.

An object of a technique of the present disclosure is to provide a learning apparatus, an operation program of the learning apparatus, and an operation method of the learning apparatus capable of appropriately determining classes and eliminating wasteful calculation processing, as compared with the technique in the related art.

In order to achieve the above object, according to an aspect of the present disclosure, there is provided a learning apparatus that inputs learning data to a machine learning model including a plurality of layers for analyzing an input image and learns the machine learning model, the machine learning model being a model for performing semantic segmentation of determining a plurality of classes in the input image in units of pixels by extracting, for each layer, features which are included in the input image and have different frequency bands of spatial frequencies, the learning apparatus including: a learning data analysis unit that analyzes at least the frequency bands included in an annotation image of the learning data, the learning data being a pair of a learning input image and the annotation image in which each class region included in the learning input image is indicated by an annotation; a learning method determination unit that determines a learning method using the learning data based on an analysis result of the frequency bands by the learning data analysis unit; and a learning unit that learns the machine learning model via the determined learning method using the learning data.

Preferably, the learning data analysis unit specifies the frequency band for which extraction of the feature is of relatively high necessity among the frequency bands, as a necessary band, by analyzing the frequency bands included in the annotation image, and the learning method determination unit reconfigures the machine learning model based on the specified necessary band.

Preferably, in the reconfiguration, the learning method determination unit determines, among the plurality of layers, a necessary layer which is necessary for learning and an optional layer which is optional in learning, based on the specified necessary band, and reduces a processing amount of the optional layer to be smaller than a processing amount of the necessary layer.

Preferably, the learning data analysis unit specifies the frequency band for which extraction of the feature is of relatively high necessity among the frequency bands, as a necessary band, by analyzing the frequency bands included in the annotation image, and the learning method determination unit matches a range of the frequency bands included in the annotation image with a range of the analyzable frequency bands in the machine learning model, by lowering the resolution of the learning input image based on the specified necessary band.

Preferably, the learning data analysis unit analyzes the frequency bands included in the annotation image and the learning input image, and the learning method determination unit determines the learning method based on an analysis result of the annotation image and an analysis result of the learning input image.

Preferably, the learning data analysis unit generates an image pyramid including a plurality of images which are obtained by gradually lowering the resolution of the annotation image and have different resolutions, and analyzes the frequency bands included in the annotation image based on the image pyramid.

Preferably, the machine learning model is configured with a convolutional neural network including an encoder network and a decoder network, the encoder network being a network that performs convolution processing of extracting an image feature map representing features which are included in the input image and have different frequency bands by performing convolution computation using a filter, performs pooling processing of outputting the image feature map having a reduced image size by calculating local statistics of the image feature map extracted by the convolution processing and compressing the image feature map, and extracts the image feature map for each layer by repeatedly performing, in the next layer, the convolution processing and the pooling processing on the image feature map which is output in the previous layer and is reduced, the decoder network being a network that generates an output image in which each class region is segmented by repeatedly performing upsampling processing and merging processing, the upsampling processing being processing of, from the minimum-size image feature map which is output in the encoder network, gradually enlarging an image size of the image feature map by upsampling, and the merging processing being processing of combining the image feature map which is gradually enlarged with the image feature map which is extracted for each layer of the encoder network and has the same image size.

Preferably, the input image is a cell image in which cells appear.

Preferably, the learning data analysis unit analyzes the frequency bands based on a learning data group including a plurality of pieces of the learning data.

According to another aspect of the present disclosure, there is provided an operation program of a learning apparatus that inputs learning data to a machine learning model including a plurality of layers for analyzing an input image and learns the machine learning model, the machine learning model being a model for performing semantic segmentation of determining a plurality of classes in the input image in units of pixels by extracting, for each layer, features which are included in the input image and have different frequency bands of spatial frequencies, the operation program causing a computer to function as: a learning data analysis unit that analyzes at least the frequency bands included in an annotation image of the learning data, the learning data being a pair of a learning input image and the annotation image in which each class region included in the learning input image is indicated by an annotation; a learning method determination unit that determines a learning method using the learning data based on an analysis result of the frequency bands by the learning data analysis unit; and a learning unit that learns the machine learning model via the determined learning method using the learning data.

According to still another aspect of the present disclosure, there is provided an operation method of a learning apparatus that inputs learning data to a machine learning model including a plurality of layers for analyzing an input image and learns the machine learning model, the machine learning model being a model for performing semantic segmentation of determining a plurality of classes in the input image in units of pixels by extracting, for each layer, features which are included in the input image and have different frequency bands of spatial frequencies, the operation method including: a learning data analysis step of analyzing at least the frequency bands included in an annotation image of the learning data, the learning data being a pair of a learning input image and the annotation image in which each class region included in the learning input image is indicated by an annotation; a learning method determination step of determining a learning method using the learning data based on an analysis result of the frequency bands in the learning data analysis step; and a learning step of learning the machine learning model via the determined learning method using the learning data.

According to the technique of the present disclosure, it is possible to appropriately determine classes and eliminate wasteful calculation processing, as compared with the technique in the related art.

BRIEF DESCRIPTION OF THE DRAWINGS

FIG. 3(A) illustrates a learning input image, and FIG. 3(B) illustrates an annotation image.

FIG. 12A is a diagram illustrating a state where no annotation is added, FIG. 12B is a diagram illustrating a state where an annotation of a fine contour is added, and FIG. 12C is a diagram illustrating a state where an annotation of a coarse contour is added.

FIG. 13 is a diagram illustrating a specific example of frequency specifying processing.

FIG. 29 is a flowchart illustrating a processing procedure of frequency analysis according to a fourth embodiment.

FIG. 30 is a diagram illustrating a specific example of processing of determining a learning method according to the fourth embodiment.

DESCRIPTION OF THE PREFERRED EMBODIMENTS

First Embodiment

Figure 1:
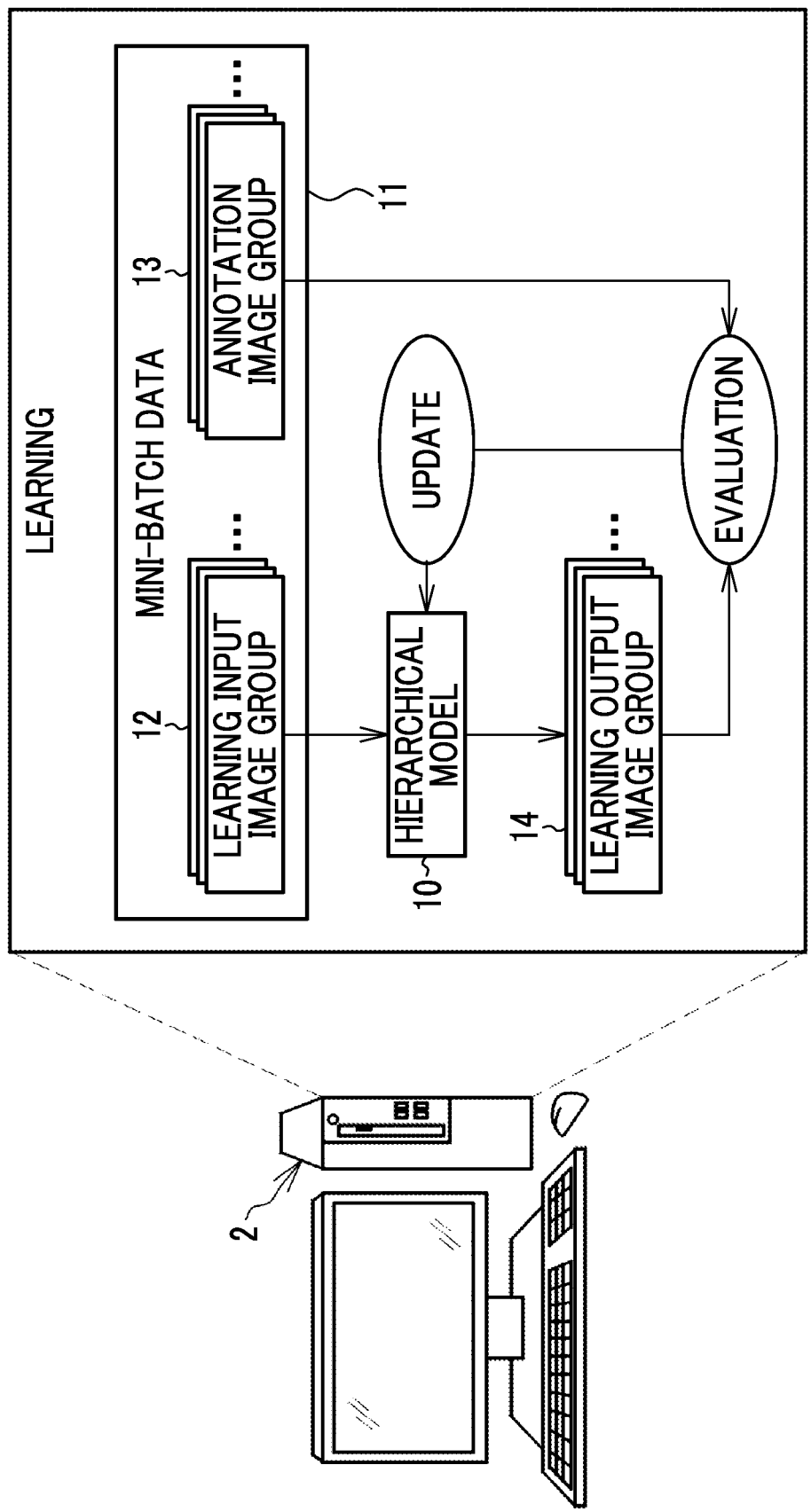
FIG. 1 is a diagram illustrating an outline of a learning apparatus and processing of the learning apparatus.

In FIG. 1, in order to improve a determination accuracy of a hierarchical model 10 for performing semantic segmentation in which a plurality of classes in an input image to be analyzed are determined in units of pixels, a learning apparatus 2 performs learning by inputting learning data to the hierarchical model 10. The learning apparatus 2 is configured with, for example, a workstation or a personal computer. Further, as will be described later, the hierarchical model 10 includes, for example, a convolutional neural network such as U-Net (refer to FIG. 6).

By inputting the learning data to the hierarchical model 10, learning the learning data, and updating the hierarchical model 10, the class determination accuracy is improved. The learning data includes a pair of a learning input image and an annotation image. The learning input image is an input image which is input to the hierarchical model 10 in learning. The annotation image is an image in which each class region included in the corresponding learning input image is indicated by an annotation. The annotation image is a correct answer image for matching an answer with a learning output image, which is output from the hierarchical model 10 in correspondence with the learning input image, and is compared with the learning output image. As the class determination accuracy of the hierarchical model 10 becomes higher, a difference between the annotation image and the learning output image becomes smaller.

The learning apparatus 2 uses mini-batch data 11 as the learning data. The mini-batch data 11 is an image group in which a plurality of predetermined pieces of learning data are clustered together, and includes a learning input image group 12 and an annotation image group 13.

In learning, the learning input image group 12 is input to the hierarchical model 10. Thereby, the learning output image 14S (refer to FIG. 6) is output from the hierarchical model 10 for each learning input image 20S (refer to FIGS. 4 and 6) included in the learning input image group 12. By comparing the learning output image which is output from the hierarchical model 10 with the annotation image 21S (refer to FIG. 5), the class determination accuracy of the hierarchical model 10 is evaluated. Specifically, the learning apparatus 2 outputs the learning output image group 14, which is a set of the learning output images 14S, in correspondence with the learning input image group 12 which is input. The learning apparatus 2 compares the individual learning output image 14S and the annotation image 21S, integrates the comparison result in units of the learning output image group 14 which is output and the annotation image group 13, and outputs the integrated result as an evaluation result. In this way, the class determination accuracy of the hierarchical model 10 is evaluated. The hierarchical model 10 is updated according to the evaluation result of the class determination accuracy. The learning apparatus 2 inputs the learning input image group 12 to the hierarchical model 10, outputs the learning output image group 14 from the hierarchical model 10, evaluates the class determination accuracy of the hierarchical model 10, and updates the hierarchical model 10 while changing the mini-batch data 11. The processing is repeated until the class determination accuracy of the hierarchical model 10 reaches a desired level.

Figure 2:
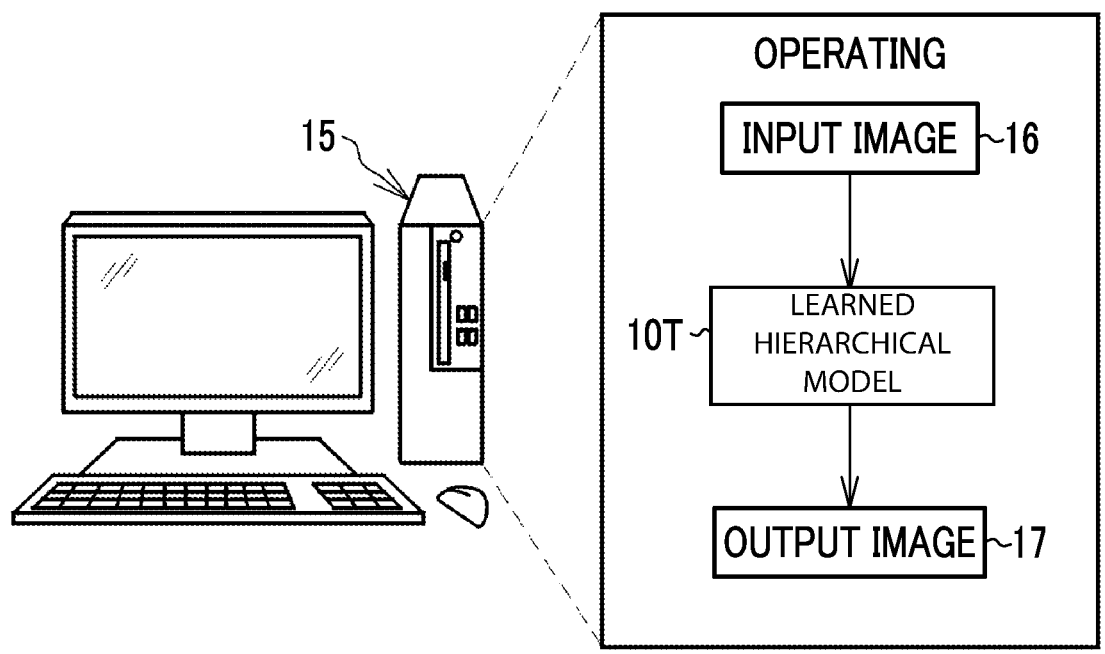
FIG. 2 is a diagram illustrating an outline of an operating apparatus and processing of the operating apparatus.

As illustrated in FIG. 2, the hierarchical model 10 in which the class determination accuracy is raised to a desired level as described above is incorporated into an operating apparatus 15, as a learned hierarchical model 10T. An input image 16 in which a class or a contour of an object that appeared is not yet determined is input to the learned hierarchical model 10T. The learned hierarchical model 10T determines a class and a contour of an object that appeared in the input image 16, and outputs an output image 17 as a determination result. Similar to the learning apparatus 2, the operating apparatus 15 is, for example, a workstation or a personal computer, and displays an input image 16 and an output image 17 side by side on a display. The operating apparatus 15 may be an apparatus different from the learning apparatus 2 or the same apparatus as the learning apparatus 2. Further, the mini-batch data 11 may be input to the learned hierarchical model 10T, and may be learned even after being incorporated into the operating apparatus 15.

Figure 3:
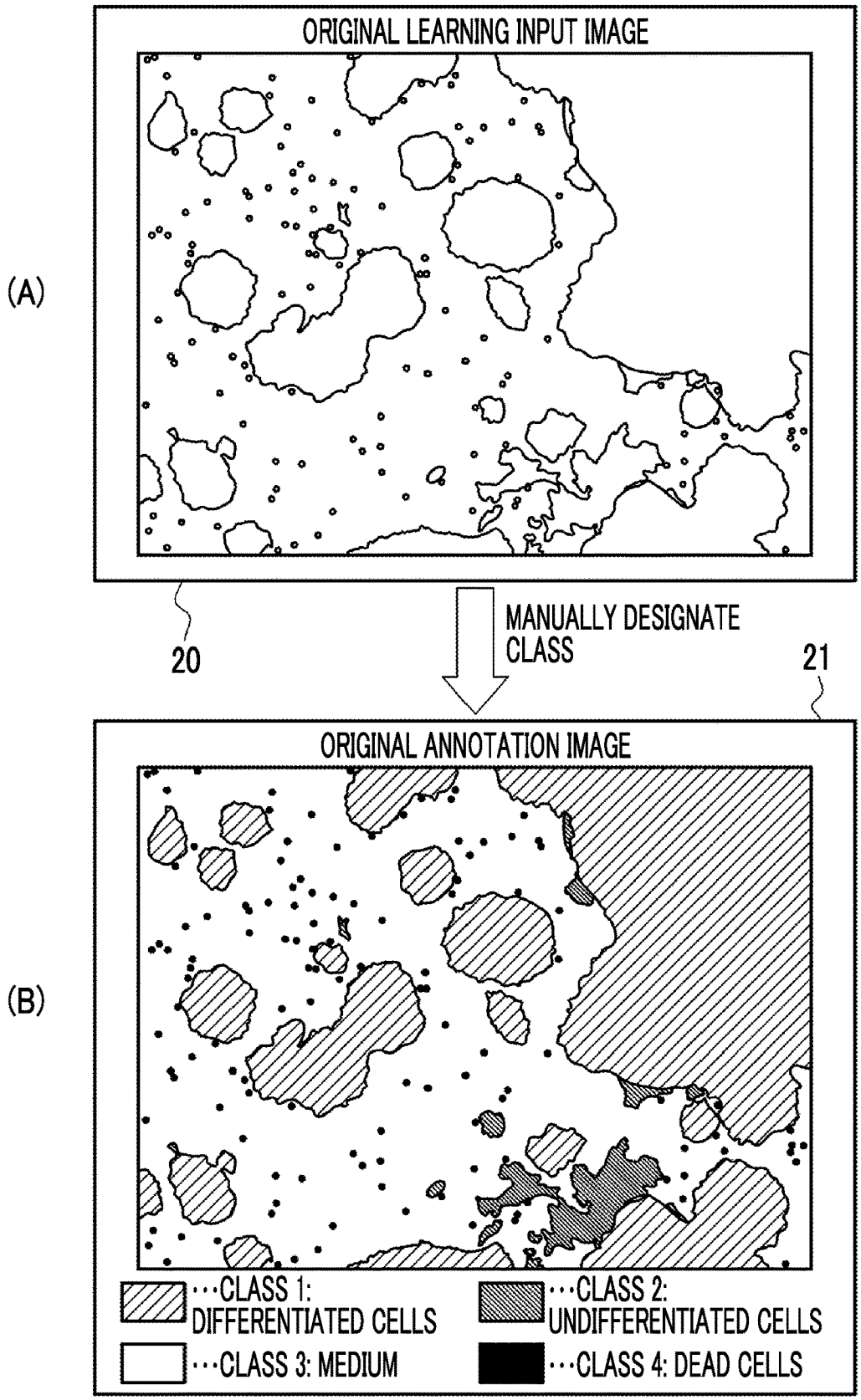
FIG. 3 is a diagram illustrating cell images.

As illustrated in FIG. 3(A), an original-sized learning input image 20 (hereinafter, referred to as an original learning input image 20) is, in this example, one phase-contrast-microscope image (corresponding to a cell image) in which a state of cell culture appears. In the learning input image 20, differentiated cells, undifferentiated cells, a medium, and dead cells appear as objects. In this case, as illustrated in FIG. 3(B), in an original-sized annotation image 21 (hereinafter, referred to as an original annotation image 21), class-1 differentiated cells, class-2 undifferentiated cells, a class-3 medium, and class-4 dead cells are respectively and manually designated. The input image 16 which is input to the learned hierarchical model 10T is also a phase-contrast-microscope image in which a state of cell culture appears, similar to the learning input image 20.

Figure 4:
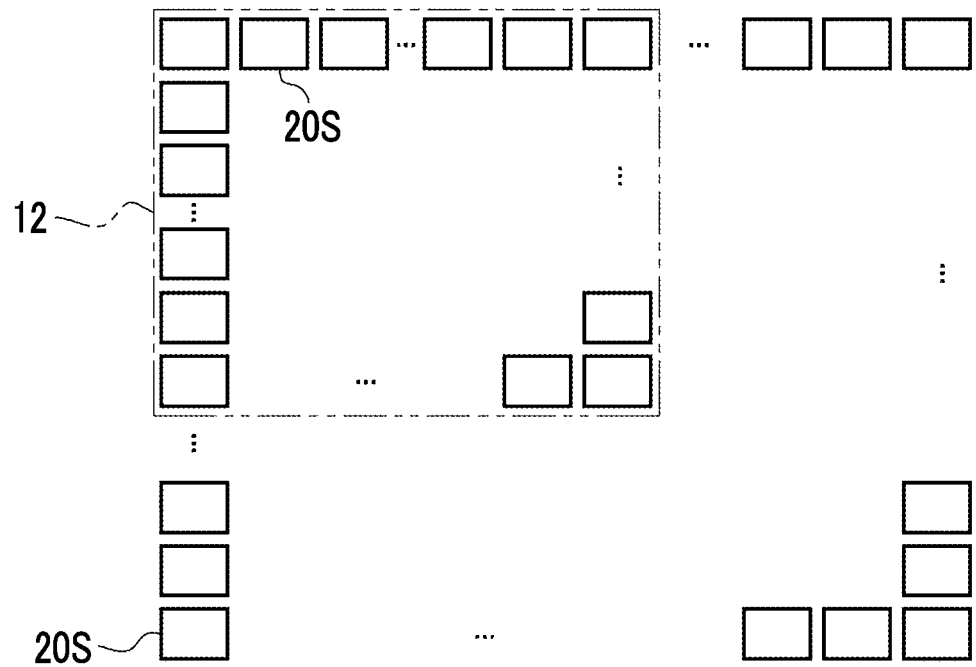
FIG. 4 is a diagram illustrating that a learning input image group is formed by dividing a learning input image.

As illustrated in FIG. 4, the learning input image 20S is a divided image obtained by cutting one original learning input image 20 into a preset image size. In order to obtain more small-sized learning input images 20S from one original learning input image 20, the learning input images 20S are cut out by partially overlapping cut-out regions of the adjacent learning input images 20S. The image size of the learning input image 20S is, for example, 1/50 of the image size of the original learning input image 20. By cutting the image while overlapping the cut-out regions, for example, 10,000 learning input images 20S are generated from one original learning input image 20. The learning input image group 12 includes a part of a plurality of learning input images 20S (for example, 100 learning input images 20S of 10,000 learning input images 20S).

Figure 5:
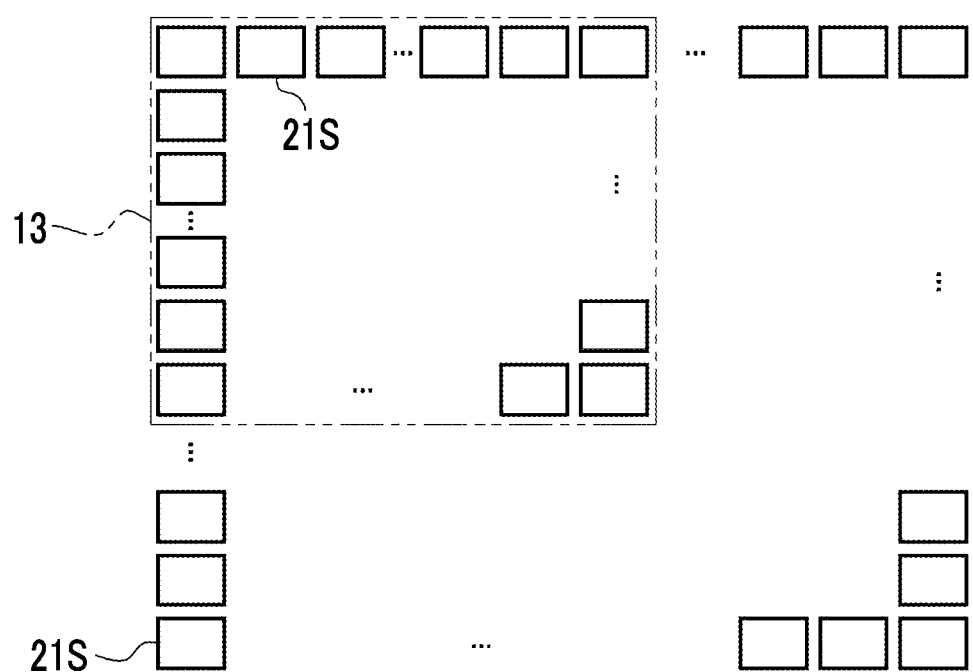
FIG. 5 is a diagram illustrating that an annotation image group is formed by dividing an annotation image.

Similarly, as illustrated in FIG. 5, the annotation image 21S is a divided image obtained by cutting one original annotation image 21 into a preset image size. Each annotation image 21S is paired with each learning input image 20S, and is included in learning data. Therefore, the annotation images 21S are also cut out from one original annotation image 21 by the same method as in the learning input image 20S by the same number of images as the number of the learning input images 20S (in this example, 10,000). The annotation image group 13 includes a part of a plurality of annotation images 21S cut out from one original annotation image 21 (for example, 100 annotation images 21S of 10,000 annotation images 21S). The learning input image 20S included in the learning input image group 12 and the annotation image 21S included in the annotation image group 13 have the same cut-out region.

The mini-batch data 11 is generated by a pair of the learning input image group 12 and the annotation image group 13. In generation of the mini-batch data 11, a technique, which is called data augmentation and increases options of the mini-batch data 11 by creating another image by performing image processing such as trimming, left-right inversion, or rotation on the learning input image 20S and the annotation image 21S, may be used.

Figure 6:
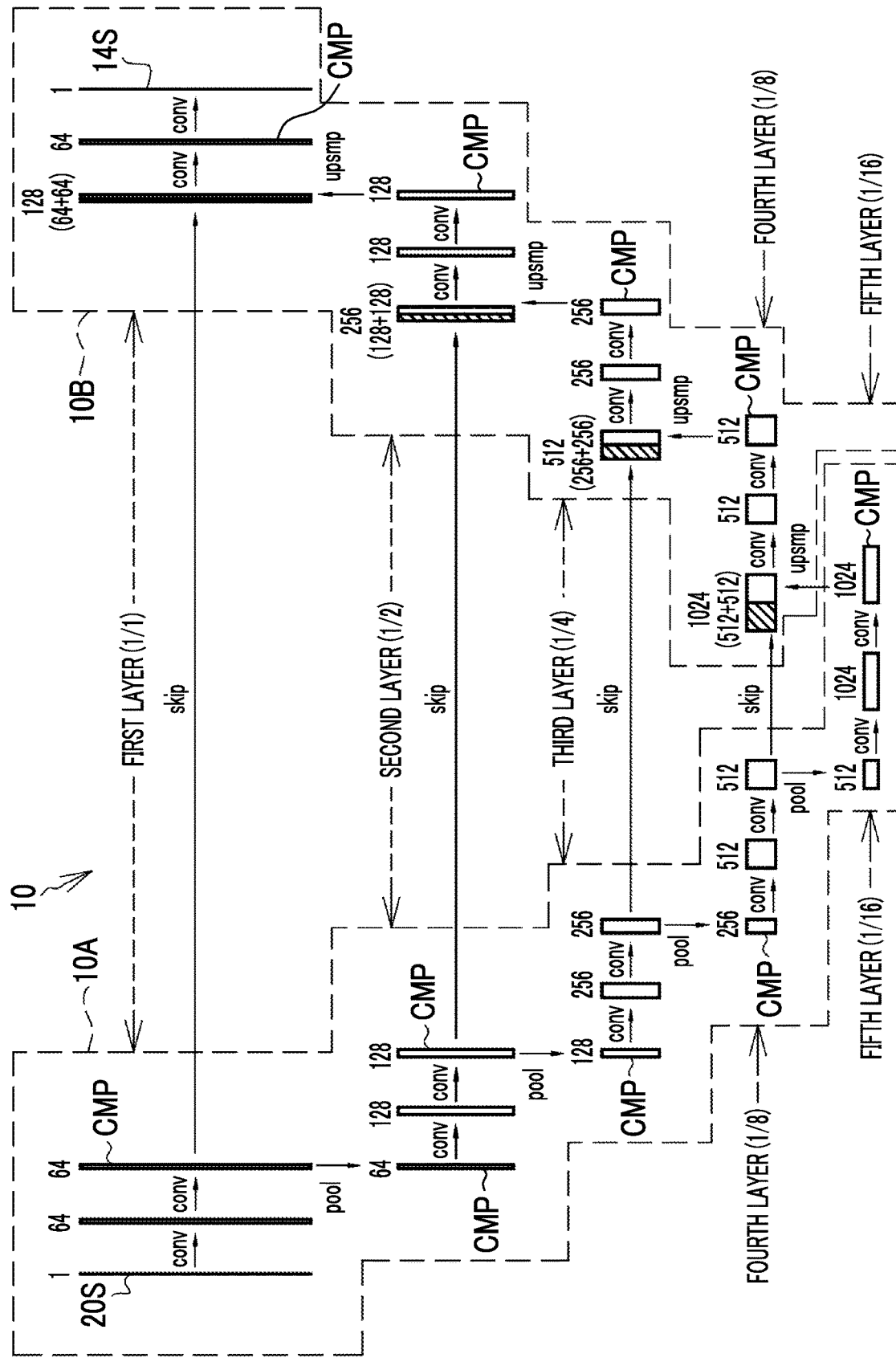
FIG. 6 is a diagram illustrating a hierarchical model.

As illustrated in FIG. 6, the hierarchical model 10 is a hierarchical model including a convolutional neural network such as U-Net. In this example, the hierarchical model 10 includes five layers of a first layer to a fifth layer.

The hierarchical model 10 includes an encoder network 10A and a decoder network 10B. The encoder network 10A performs convolution processing of extracting an image feature map CMP as an example of features which are included in the learning input image 20S and have different frequency bands, by performing convolution computation using a filter for each layer. The decoder network 10B gradually enlarges an image size of a minimum-size image feature map CMP which is output in the encoder network 10A. The image feature map CMP which is gradually enlarged and the image feature map CMP which is output in each layer of the encoder network 10A are combined with each other, and thus a learning output image 14S having an image size similar to the image size of the learning input image 20S is generated.

In each layer of the encoder network 10A, input data in which a plurality of pixel values are two-dimensionally arranged is input. In each layer, convolution processing is performed on the input data, and thus an image feature map CMP is extracted. The learning input image 20S is input to the first layer of the encoder network 10A, as input data. In the first layer, convolution processing is performed on the learning input image 20S, and thus, for example, an image feature map CMP having the same image size as the learning input image 20 is output. In the second layer and the lower layers, the image feature map CMP output by each higher layer is input. In the second layer and the lower layers, convolution processing is performed on the image feature map CMP, and thus, for example, an image feature map CMP having the same image size as the input image feature map CMP is output. The convolution processing is indicated by "cony" (convolution) in FIG. 6.

Figure 7:
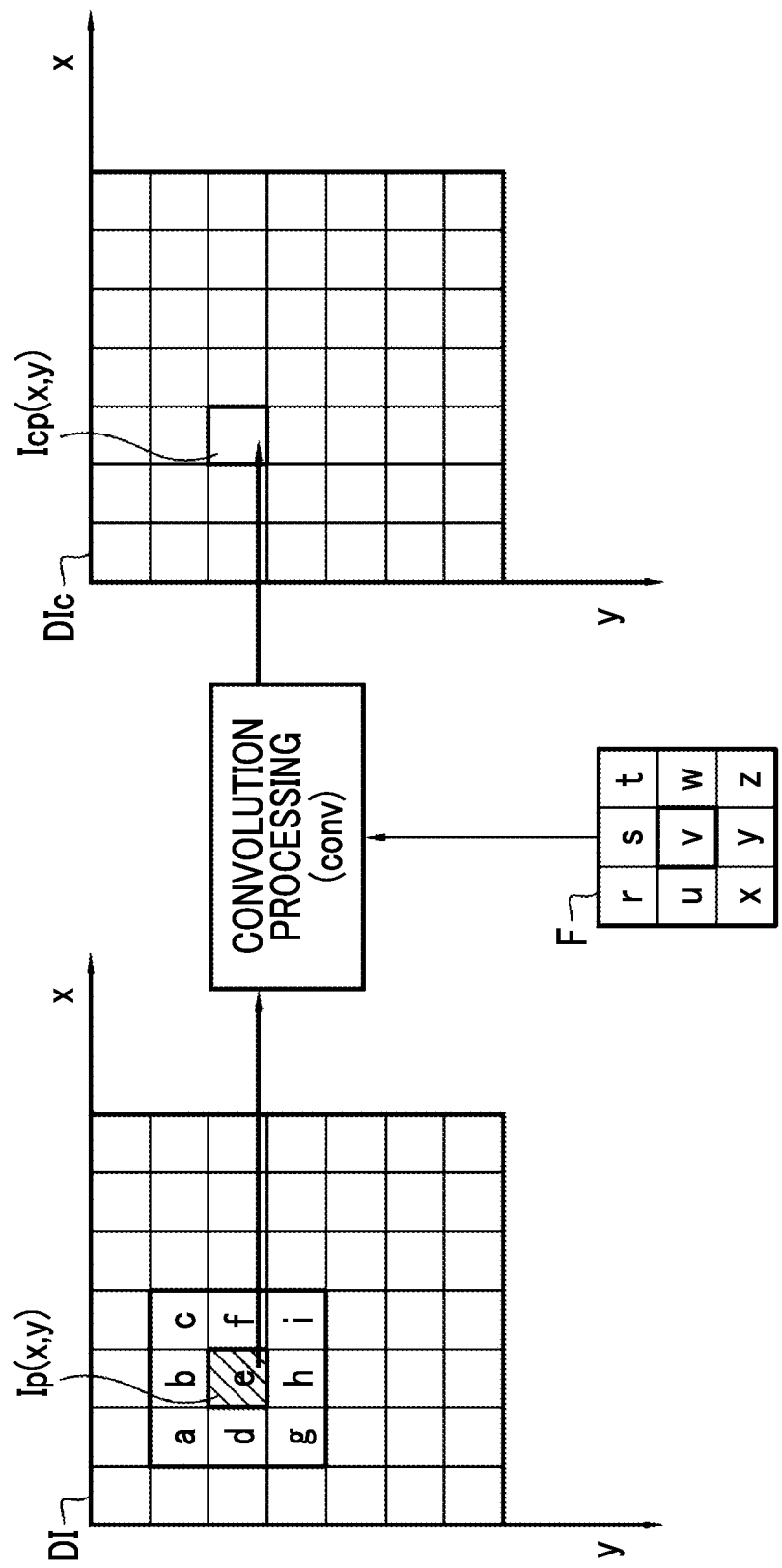
FIG. 7 is a diagram explaining convolution processing.

As illustrated in FIG. 7, convolution processing is performed on input data DI such as the learning input image 20S or the image feature map CMP, in which the pixel values are two-dimensionally arranged. In the convolution processing, a filter F is applied to the input data DI, and convolution computation of convoluting pixel values of adjacent pixels in the input data DI is performed. Thereby, similar to the input data DI, output data DIc in which the pixel values are two-dimensionally arranged is obtained. It is assumed that a pixel value Ip (x, y) of an interest pixel Ip in the input data DI is "e", pixel values of adjacent pixels of the interest pixel are "a" to "i", and coefficients of a 3×3 filter F are "r" to "z", and as a result of convolution computation on the interest pixel Ip, a pixel value Icp (x, y) of a pixel Icp of the output data DIc is calculated according to, for example, the following Equation.

$$Icp(x,y)=az+by+cx+dw+ev+fu+gt+hs+ir \quad \text{Equation}$$

In the convolution processing, convolution computation is performed on each pixel, and thus the pixel value Icp (x, y) corresponding to each interest pixel Ip is output. In this way, the output data DIc in which the pixel values Icp (x, y) are two-dimensionally arranged is output. One piece of the output data DIc is output in correspondence with one filter F. In a case where a plurality of filters F having different types are used, the output data DIc is output for each filter F.

Figure 8:
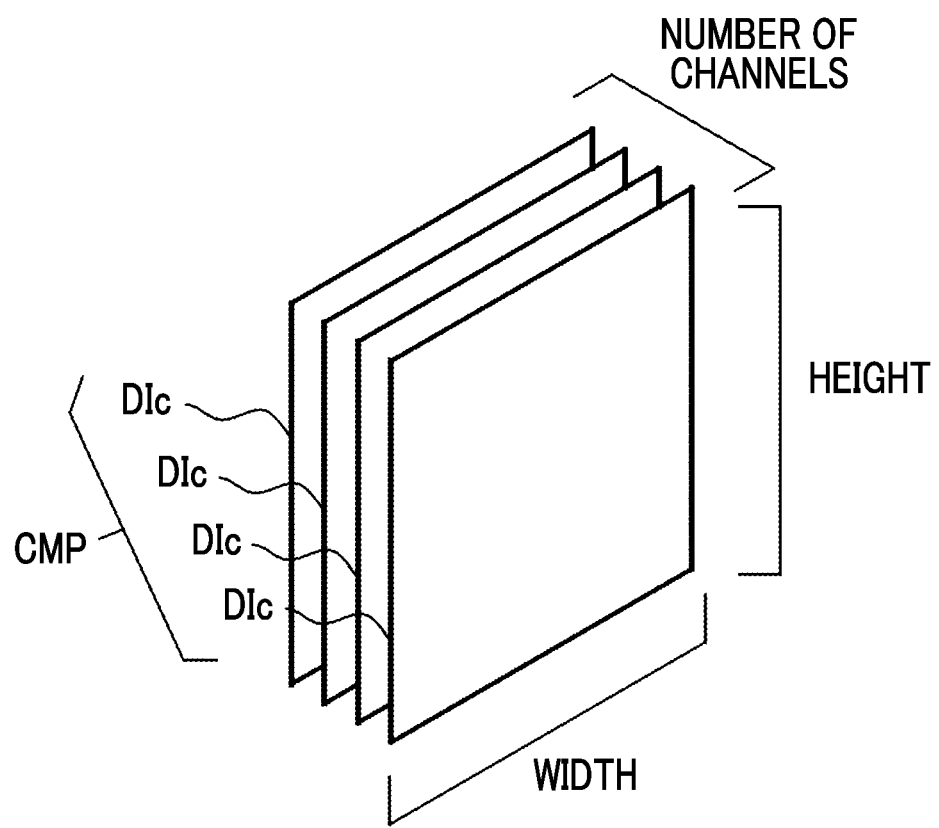
FIG. 8 is a diagram illustrating an image feature map.

As illustrated in FIG. 8, the output data DIc is data in which the pixel values Icp (x, y) are two-dimensionally arranged, and has a width and a height. Further, in a case where a plurality of pieces of output data DIc are output by applying a plurality of filters F having different types, the image feature map CMP is a set of the plurality of pieces of output data DIc. In the image feature map CMP, the number of filters F is called the number of channels. The image feature map CMP illustrated in FIG. 8 is an example of an image feature map CMP including pieces of output data DIc for four channels.

Figure 9:
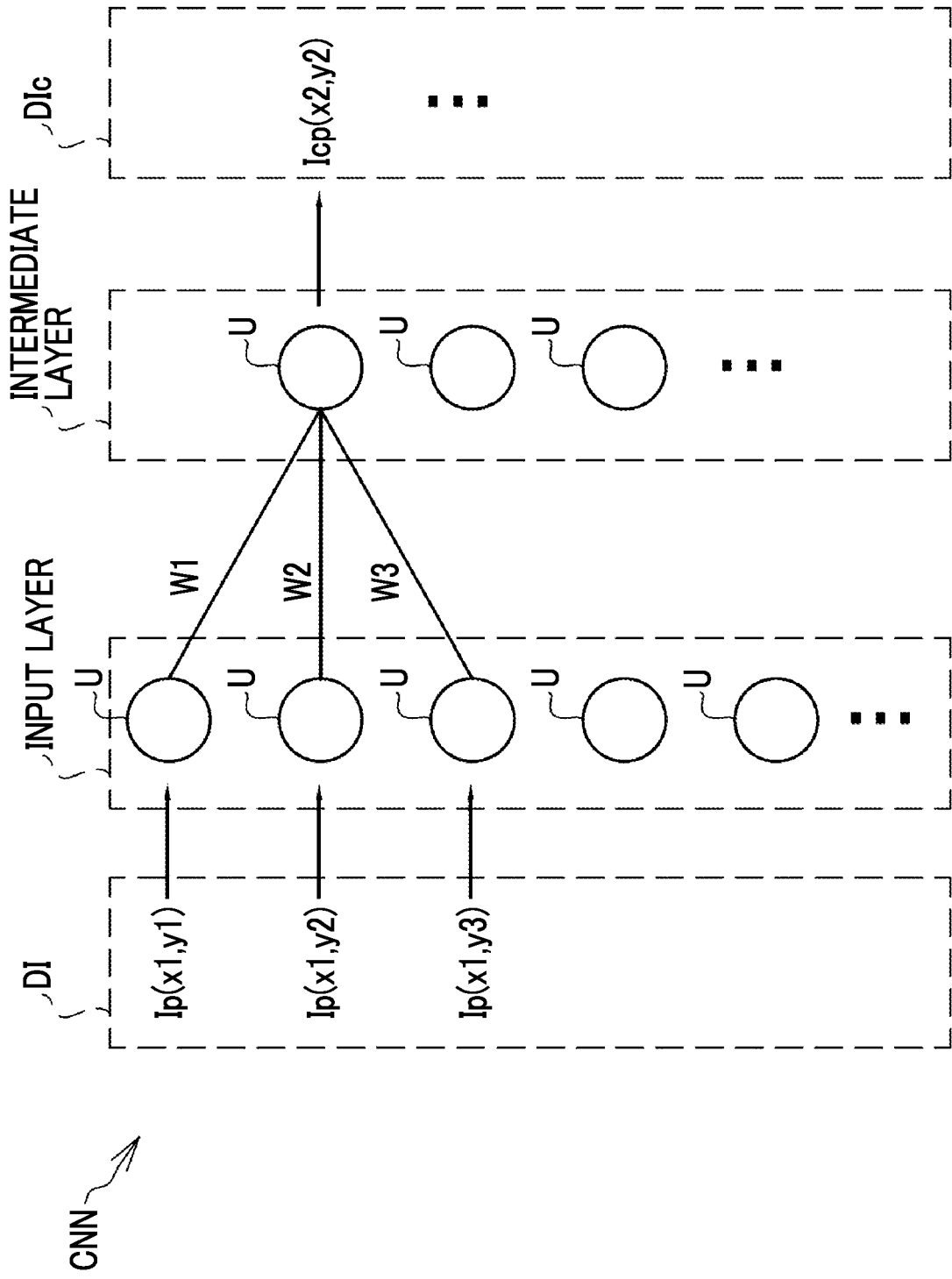
FIG. 9 is a diagram illustrating a correspondence relationship between an image and a neural network.

FIG. 9 is a diagram explaining a concept in which the convolution processing using the filter F is applied to the convolutional neural network CNN. As illustrated in FIG. 9, it is assumed that the convolutional neural network CNN includes an input layer and an intermediate layer which include a plurality of units U. In this case, weights w1, w2, and w3 indicating strengths of links between each unit U of the input layer and each unit U of the intermediate layer correspond to coefficients of the filter F. Each pixel value Ip (x1, y1), Ip (x1, y2), Ip (x1, y3), . . . of the input data DI is input to each unit U of the input layer, and a sum of products of each pixel value Ip (x1, y1), Ip (x1, y2), Ip (x1, y3), . . . and the weights w1, w2, and w3 is an output value of each unit U in the intermediate layer. The output value corresponds to the pixel value Icp (x, y) of the output data DIc. In a case where the hierarchical model 10 is learned, the coefficients of the filter F corresponding to the weights w1, w2, w3, . . . are updated.

Returning to FIG. 6, the numbers "64", "128", "256", "512", and "1024" shown on each image feature map CMP indicate the number of channels of each image feature map CMP. The parenthesized "1/1", "½", "¼", "⅛", and "1/16" added to the first layer to the fifth layer indicate the image size handled in each layer as compared with the image size of the highest-level input image (learning input image 20S) as a reference.

In this example, in the first layer of the encoder network 10A, two-time convolution processing (cony) is performed. First, convolution processing of applying 64 filters F is performed on the learning input image 20S, and thus a 64-channel image feature map CMP is output. Next, convolution processing of applying 64 filters F is further performed on the image feature map CMP, and thus, in the first layer, a 64-channel image feature map CMP is finally output.

In the encoder network 10A, the image size, which corresponds to the width and the height of the image feature map CMP output by the first layer, is the same as the image size of the learning input image 20S. For this reason, the image size handled by the first layer is the same as the image size of the input image (equal magnification (1/1)).

In the first layer of the encoder network 10A, pooling processing is performed on the image feature map CMP extracted by the two-time convolution processing. The pooling processing (in FIG. 6, indicated by "pool") is processing of calculating local statistics of the image feature map CMP and compressing the image feature map CMP. As the local statistics, for example, a maximum value or an average value of pixel values in a 2×2 pixel block is used. The pooling processing for calculating the maximum value is called maximum-value pooling, and the pooling processing for calculating the average value is called average-value pooling. That is, it can be said that the pooling processing is processing of reducing the image size by lowering the resolution of the image feature map CMP by selecting a local representative value. For example, in the pooling processing of selecting a representative value from a 2×2 pixel block, in a case where a stride is set to "1", that is, in a case where the pooling processing is performed by shifting the image feature map CMP by one pixel, the image feature map CMP is reduced to half the original image size. In this example, in the first layer, pooling processing of halving the image size of the image feature map is performed.

In the encoder network 10A, the image feature map, which is output in the previous first layer and of which the image size is reduced to ½ of the image size of the learning input image 20S as a reference, is input to the next second layer, as input data.

In the second layer, two-time convolution processing of applying 128 filters F is performed, and a 128-channel image feature map CMP is output. Next, pooling processing of halving the image size is performed on the 128-channel image feature map CMP. Thereby, in the second layer, an image feature map CMP of which the image size is reduced to ¼ of the image size of the learning input image 20S is output.

Similarly, in the encoder network 10A, an image feature map CMP, which is output in the previous second layer and has 128 channels and an image size of ¼, is input to the next third layer, as input data. In the third layer, after two-time convolution processing of applying 256 filters is performed, pooling processing of further halving the image size of the image feature map CMP extracted by the convolution processing is performed. Thereby, in the third layer, an image feature map CMP, which has 256 channels and of which the image size is ⅛ of the image size of the learning input image 20S as a reference, is output.

Similarly, in the encoder network 10A, an image feature map CMP, which is output in the previous third layer and has 256 channels and an image size of ⅛, is input to the next fourth layer, as input data. In the fourth layer, after two-time convolution processing of applying 512 filters is performed, pooling processing of further halving the image size of the image feature map CMP extracted by the convolution processing is performed. Thereby, in the fourth layer, an image feature map CMP, which has 512 channels and of which the image size is 1/16 of the image size of the learning input image 20S as a reference, is output.

In the encoder network 10A, an image feature map CMP, which is output in the previous fourth layer and has 512 channels and an image size of 1/16, is input to the lowest fifth layer, as input data. In the fifth layer, two-time convolution processing of applying 1024 filters is performed. In the lowest fifth layer, pooling processing is not performed on the image feature map CMP extracted by the convolution processing.

As described above, in the encoder network 10A, from the highest first layer to the lowest fifth layer, the image size of the input data (the input image or the image feature map CMP) which is input to each layer is gradually reduced, and thus the resolution is lowered. In this example, it is assumed that the image size of the input image (learning input image 20S) which is input to the first layer is set as a reference image size, the input data of which the image size is 1/1 (equal magnification) of the reference image size is input to the first layer, the input data of which the image size is ½ of the reference image size is input to the second layer, and the input data of which the image size is ¼ of the reference image size is input to the third layer. Further, the input data of which the image size is ⅛ of the reference image size is input to the fourth layer, and the input data of which the image size is 1/16 of the reference image size is input to the fifth layer.

In each layer of the encoder network 10A, the filter F is applied to the input data having different resolutions for each layer, and convolution processing is performed on pixel values of adjacent images. For this reason, in the first layer, convolution processing is performed on the input data having the highest resolution. Thus, the image feature map CMP extracted by the first layer represents features of the finest structure having a frequency band of the highest spatial frequency in the input image. In the second layer and the third layer, convolution processing is performed on the input data having a resolution lower than the resolution of the input image. Thus, the image feature maps CMP extracted by the second layer and the third layer represent features of a medium structure having a frequency band of a spatial frequency lower than the spatial frequency of the first layer. Similarly, in the fourth layer and the fifth layer, the resolution of the input data is further lowered. Thus, the image feature maps CMP extracted by the fourth layer and the fifth layer represent features of a coarse structure having a frequency band of a lower spatial frequency.

As described above, in the encoder network 10A, for each layer of the highest first layer to the lowest fifth layer, features of an image which are included in the input image and have different frequency bands are output. As will be described later, each of 1/1 to 1/16 indicating the image sizes of the first layer to the fifth layer may be used as an index indicating a frequency band that each layer is capable of analyzing. That is, 1/1 is an index indicating a frequency band of the highest spatial frequency, and 1/16 is an index indicating a frequency band of the lowest spatial frequency.

In the encoder network 10A, as the layer becomes lower, the number of filters F is increased. This is a way for extracting various features included in the input image by increasing the number of filters F as the image size becomes smaller.

In the first layer to the fourth layer of the encoder network 10A, the image feature map CMP extracted by each layer is transmitted to the decoder network 10B. This processing is called skip layer processing, and is indicated by "skip" in FIG. 6. In each layer of the decoder network 10B, the image feature map CMP indicated by hatching is the image feature map CMP transmitted from the encoder network 10A.

The decoder network 10B performs upsampling processing of gradually enlarging an image size of a minimum-size image feature map CMP which is output in the encoder network 10A. In addition, the decoder network 10B repeats merging processing of combining the image feature map CMP which is gradually enlarged and the image feature map CMP which is output for each layer in the encoder network 10A and has the same image size. Thereby, an output image (learning output image 14S) in which each class region of the input image (learning input image 20S) is segmented is generated.

The decoder network 10B includes a first layer to a fifth layer corresponding to each layer of the encoder network 10A. In the upsampling processing (in FIG. 6, indicated by "upsmp") performed in each layer of the decoder network 10B, the image feature map is enlarged so as to have the same size as the image size of each layer corresponding to the encoder network 10A.

Further, in this example, the upsampling processing is, for example, upconvolution processing of enlarging the image size and that involves convolution processing of applying a filter F. In each layer of the decoder network 10B, upsampling processing involving convolution processing is completed, and then merging processing and convolution processing are performed.

The fifth layer of the decoder network 10B first receives the image feature map CMP having a minimum size ($1/16$) that is output by the lowest fifth layer of the encoder network 10A. The number of channels of the image feature map CMP is 1024. The fifth layer of the decoder network 10B enlarges the image feature map CMP having an image size of $1/16$ by doubling the image size to an image size of $1/8$, and performs convolution processing of applying 512 filters F. Thereby, the number of channels is halved to 512. In the decoder network 10B, a 512-channel image feature map CMP having an image size of $1/8$ is output from the fifth layer to the fourth layer.

In the fourth layer of the decoder network 10B, merging processing of combining the image feature map CMP received from the fifth layer and the image feature map CMP transmitted from the fourth layer of the encoder network 10A is performed. The image feature maps CMP combined in the fourth layer have an image size of $1/8$ and 512 channels. Therefore, in the fourth layer, an image feature map CMP having an image size of $1/8$ and 1024 channels (512+512) is generated by the merging processing.

Further, in the fourth layer, two-time convolution processing of applying 512 filters F is performed on the 1024-channel image feature map CMP, and thus an image feature map CMP having an image size of $1/8$ and 512 channels is generated. In the fourth layer, upsampling processing of halving both the image size and the number of channels is performed on the image feature map CMP having an image size of $1/8$. Thereby, finally, an image feature map CMP having an image size of $1/4$ and 256 channels is output from the fourth layer to the third layer.

In the third layer of the decoder network 10B, merging processing of combining the image feature map CMP received from the fourth layer and the image feature map CMP transmitted from the third layer of the encoder network 10A is performed. The image feature maps CMP combined in the third layer have an image size of $1/4$ and 256 channels. Therefore, in the third layer, an image feature map CMP having an image size of $1/4$ and 512 channels (256+256) is generated by the merging processing.

Further, in the third layer, two-time convolution processing of applying 256 filters F is performed on the 512-channel image feature map CMP, and thus an image feature map CMP having an image size of $1/4$ and 256 channels is generated. In the third layer, upsampling processing of halving both the image size and the number of channels is performed on the image feature map CMP having an image size of $1/4$. Thereby, finally, an image feature map CMP having an image size of $1/2$ and 128 channels is output from the third layer to the second layer.

In the second layer of the decoder network 10B, merging processing of combining the image feature map CMP received from the third layer and the image feature map CMP transmitted from the second layer of the encoder network 10A is performed. The image feature maps CMP combined in the second layer have an image size of $1/2$ and 128 channels. Therefore, in the second layer, an image feature map CMP having an image size of $1/2$ and 256 channels (128+128) is generated by the merging processing.

Further, in the second layer, two-time convolution processing of applying 128 filters F is performed on the 256-channel image feature map CMP, and thus an image feature map CMP having an image size of $1/2$ and 128 channels is generated. In the second layer, upsampling processing of halving both the image size and the number of channels is performed on the image feature map CMP having an image size of $1/2$. Thereby, finally, an image feature map CMP having an image size of 1/1 and 64 channels is output from the second layer to the first layer.

In the first layer of the decoder network 10B, merging processing of combining the image feature map CMP received from the second layer and the image feature map CMP transmitted from the first layer of the encoder network 10A is performed. The image feature maps CMP combined in the first layer have an image size of 1/1 and 64 channels. Therefore, in the first layer, an image feature map CMP having an image size of 1/1 and 128 channels (64+64) is generated by the merging processing.

Further, in the first layer, for the 128-channel image feature map CMP, convolution processing of applying 64 filters F is performed once, and then convolution processing of applying one filter F is performed. Thereby, the learning output image 14S having the same image size as the learning input image 20S is generated.

As described above, the decoder network 10B gradually enlarges the image size of the minimum-size image feature map CMP which is output in the encoder network 10A. Thus, the decoder network 10B generates the learning output image 14S by combining the image feature maps extracted for each layer by the encoder network 10A while enlarging the image feature maps CMP. The minimum-size image feature map CMP which is output by the encoder network 10A represents features of a coarse structure having the lowest spatial frequency in the learning input image 20S. The decoder network 10B incorporates the features from the medium structure to the fine structure by combining the image feature maps CMP from the encoder network 10A, while enlarging the features of the coarse structure by enlarging the minimum-size image feature map CMP.

By using the encoder network 10A and the decoder network 10B, the hierarchical model 10 generates the learning output image 14S in which the classes included in the learning input image 20S are divided into regions for learning.

Figure 10:
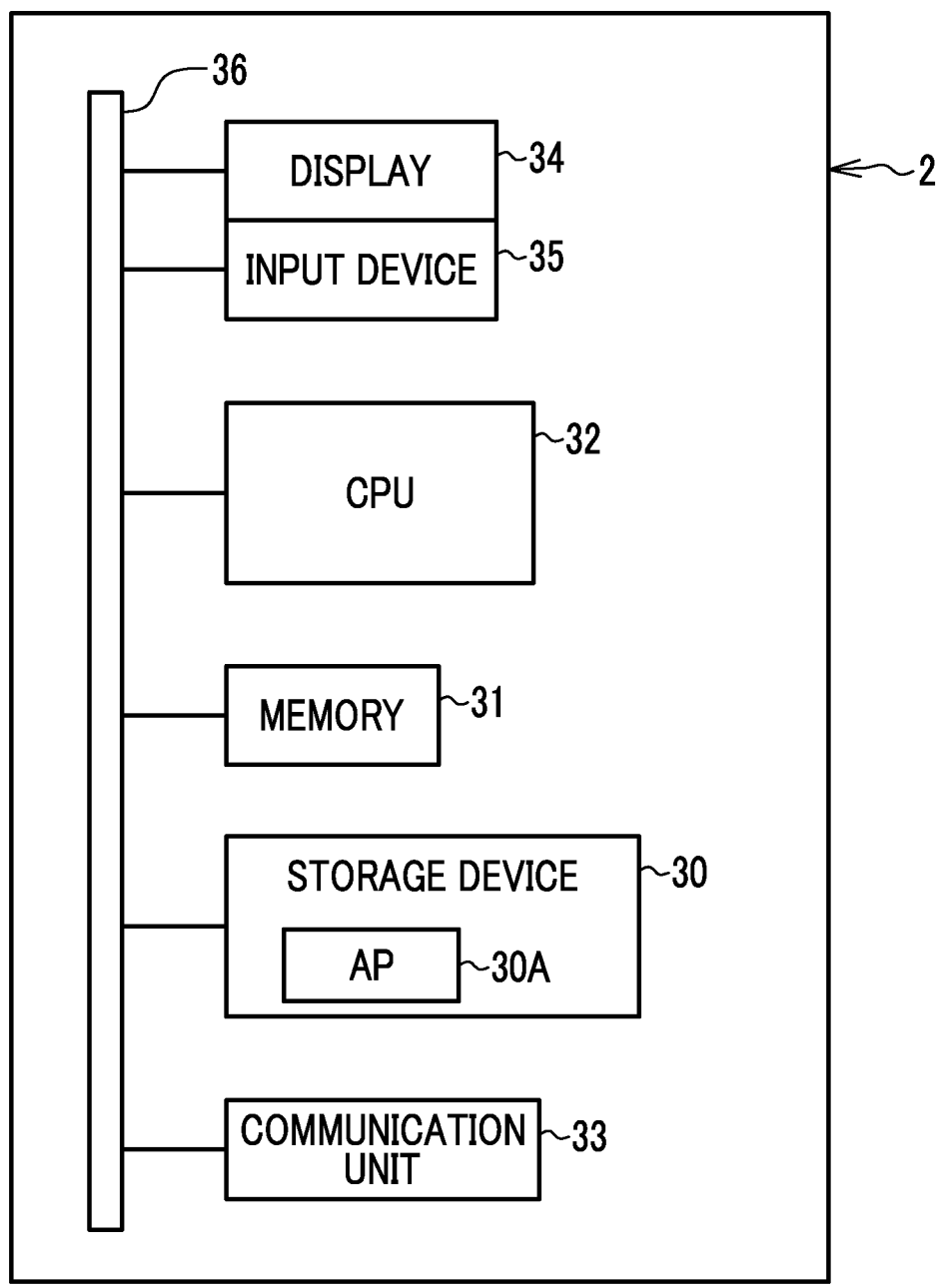
FIG. 10 is a block diagram illustrating a computer including a learning apparatus.

In FIG. 10, a computer including the learning apparatus 2 includes a storage device 30, a memory 31, a central processing unit (CPU) 32, a communication unit 33, a display 34, and an input device 35. The components are connected to each other via a data bus 36.

The storage device 30 is a hard disk drive that is built in the computer including the learning apparatus 2 or is connected via a cable or a network. Alternatively, the storage device 30 is a disk array in which a plurality of hard disk drives are connected in series. The storage device 30 stores a control program such as an operating system, various application programs (AP) 30A, and various data associated with the programs.

The memory 31 is a work memory which is necessary to execute processing by the CPU 32. The CPU 32 loads the program stored in the storage device 30 into the memory 31, and collectively controls each unit of the computer by executing processing according to the program.

The communication unit 33 is a network interface that controls transmission of various information via a network such as a local area network (LAN), the Internet, or a wide area network (WAN) such as a public communication network. The display 34 displays various screens. The various screens include operation functions by a graphical user interface (GUI). The computer including the learning apparatus 2 receives an input of an operation instruction from the input device 35 via the various screens. The input device 35 includes a keyboard, a mouse, a touch panel, and the like.

The AP 30A includes an operation program for causing the computer to function as the learning apparatus 2. The storage device 30 stores a hierarchical model 10, an original learning input image 20, an original annotation image 21, a learning input image group 12 including a learning input image 20S, and an annotation image group 13 including an annotation image 21S, as various data associated with the operation program.

Figure 11:
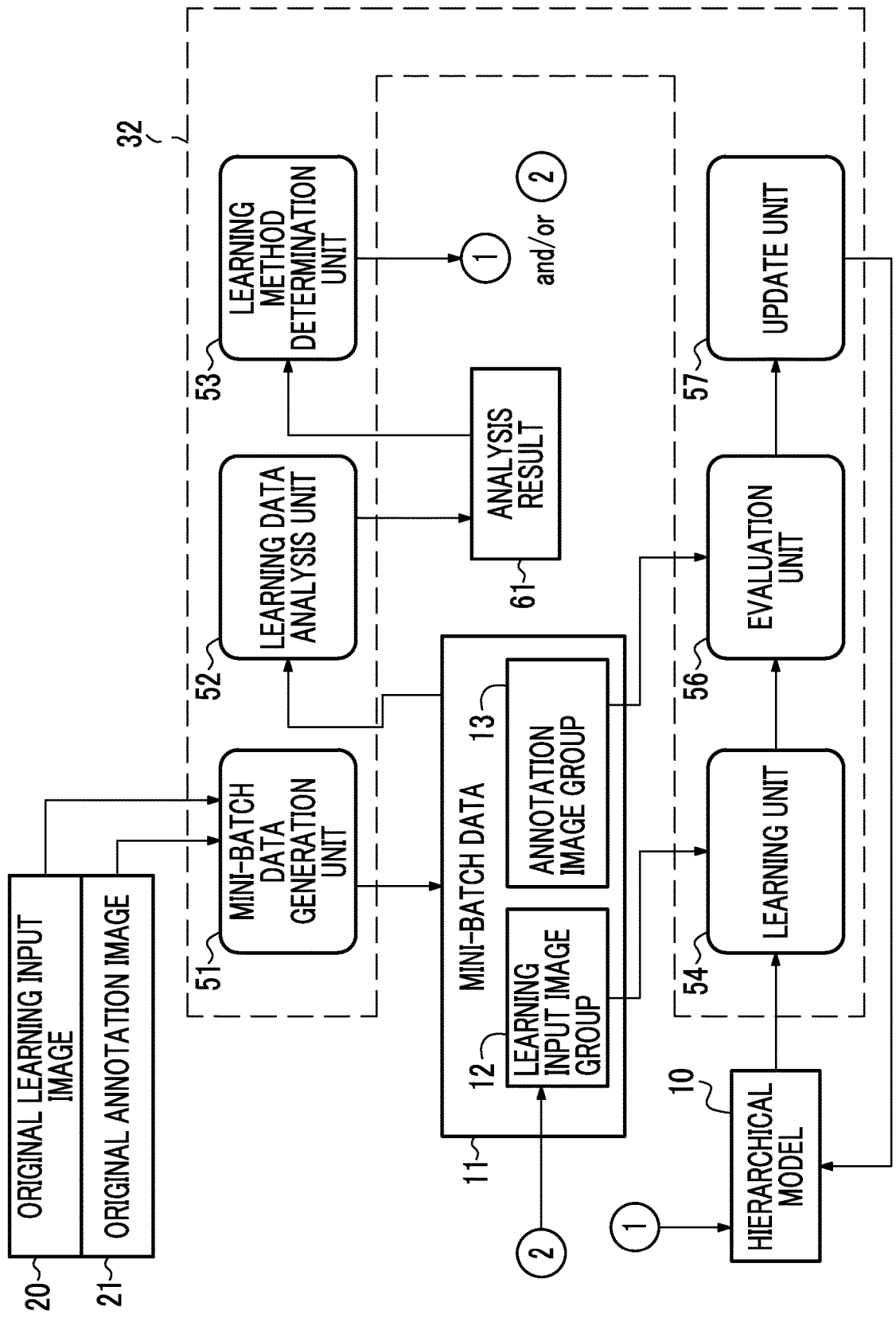
FIG. 11 is a block diagram illustrating a processing unit realized by a CPU of the learning apparatus.

As illustrated in FIG. 11, in a case where the operation program is started, the CPU 32 of the computer including the learning apparatus 2 functions as a mini-batch data generation unit 51, a learning data analysis unit 52, a learning method determination unit 53, a learning unit 54, an evaluation unit 56, and an update unit 57, in cooperation with the memory 31.

The mini-batch data generation unit 51 generates a plurality of learning input images 20S and a plurality of annotation images 21S by dividing the original learning input image 20 and the original annotation image 21. The mini-batch data generation unit 51 generates mini-batch data 11 including the learning input image group 12 and the annotation image group 13 by selecting a preset number of learning input images 20S and a preset number of annotation images 21S, from the plurality of learning input images 20S and the plurality of annotation images 21S. The mini-batch data generation unit 52 generates a plurality of sets (for example, 100 sets) of mini-batch data 11.

The learning data analysis unit 52 analyzes a frequency of the learning data. Specifically, the learning data analysis unit 52 extracts the annotation image group 13 from the generated mini-batch data 11, analyzes frequency bands of spatial frequencies included in each annotation image 20S, and outputs an analysis result 61 of the annotation image group 13.

The learning method determination unit 53 determines a learning method using the learning data including a pair of the learning input image group 12 and the annotation image group 13, based on the analysis result 61 of the frequency bands. As will be described later, the learning method is determined so as to match the frequency bands of the spatial frequencies of the classes to be determined in the learning data with the frequency bands that the hierarchical model is capable of analyzing.

Specifically, determination of the learning method is to determine whether to perform reconfiguration of the hierarchical model 10 and perform learning, whether to perform correction of the learning input image group 13 included in the mini-batch data 11 which is an example of the learning data and perform learning, or whether to perform reconfiguration of the hierarchical model 10 and correction of the learning input image group 13 and perform learning. The learning method determination unit 53 performs reconfiguration of the hierarchical model 10 and/or correction of the learning input image group 13 according to the determined learning method.

In a case where the hierarchical model 10 is reconfigured by the learning method determination unit 53, the reconfigured hierarchical model 10 is input to the learning unit 54. In a case where the learning input image group 13 is corrected by the learning method determination unit 53, the corrected learning input image group 13 is input to the learning unit 54.

The learning unit 54 learns the hierarchical model 10 via the determined learning method using the mini-batch data 11. In learning, each learning input image 20S included in the learning input image group 12 is input to the hierarchical model 10 one by one, as an input image. The learning unit 54 appropriately reads the hierarchical model 10 from the storage device 30 into the memory 31, and executes processing defined in the hierarchical model 10 illustrated in FIG. 6 based on the learning input image 20S which is input. As described above, the processing includes convolution processing, pooling processing, skip layer processing, upsampling processing, merging processing, and the like. By executing the processing, the learning output image 14S is output from the hierarchical model 10.

In a case where learning is performed on one learning input image group 13, a learning output image group 14 is obtained. The learning output image group 14 is output to the evaluation unit 56. Further, the evaluation unit 56 acquires the annotation image group 13 corresponding to the learning input image group 12 which is input, from the mini-batch data 11.

The evaluation unit 56 evaluates the class determination accuracy of the hierarchical model 10 by comparing the annotation image group 13 from the mini-batch data 11 with the learning output image group 14 from the learning unit 54. The evaluation unit 56 outputs an evaluation result to the update unit 57.

The evaluation unit 56 evaluates the class determination accuracy of the hierarchical model 10 by using a loss function. The loss function is a function representing a degree of difference between the annotation image group 13 and the learning output image group 14. As a value calculated by the loss function becomes closer to 0, the class determination accuracy of the hierarchical model 10 becomes higher. Specifically, by comparing each annotation image group 13 included in the annotation image group 13 with each learning output image 14S included in the learning output image group 14, the evaluation unit 56 determines the difference between the annotation image 21S and the learning output image 14S. The evaluation unit 56 sums the differences between the annotation images 21S and the learning output images 14S in units of the annotation image group 13 and the learning output image group 14, and evaluates the total difference as a loss calculated using the loss function.

The update unit 57 updates the hierarchical model 10 according to an evaluation result from the evaluation unit 54. More specifically, the update unit 57 changes various parameter values such as the coefficients of the filter F of the hierarchical model 10, via a stochastic gradient descent method or the like using a learning coefficient.

Figure 12A:
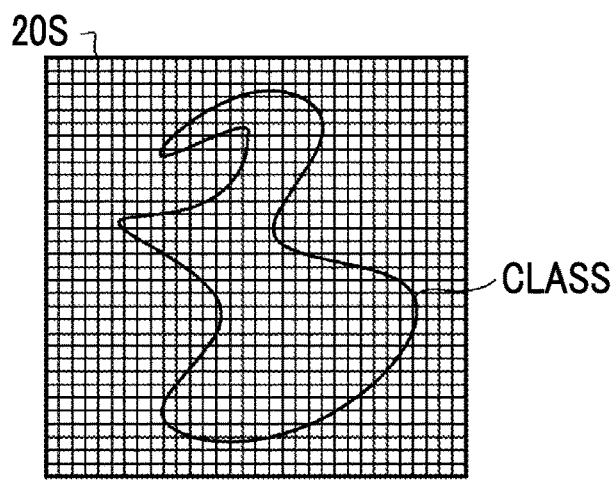
FIGS. 12A to 12C are diagrams illustrating a difference in coloring of an annotation image.
Figure 12B:
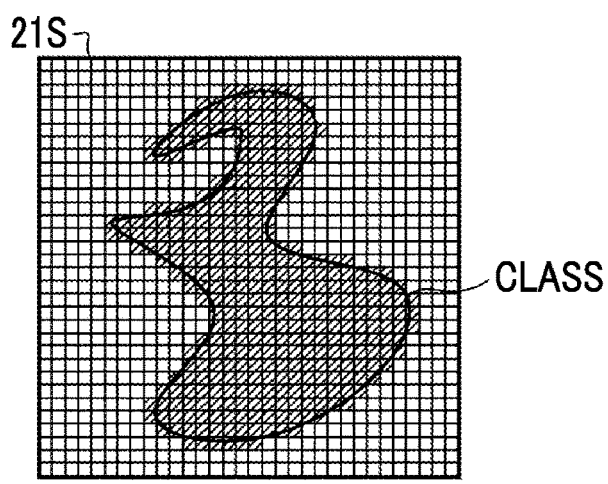
Figure 12C:
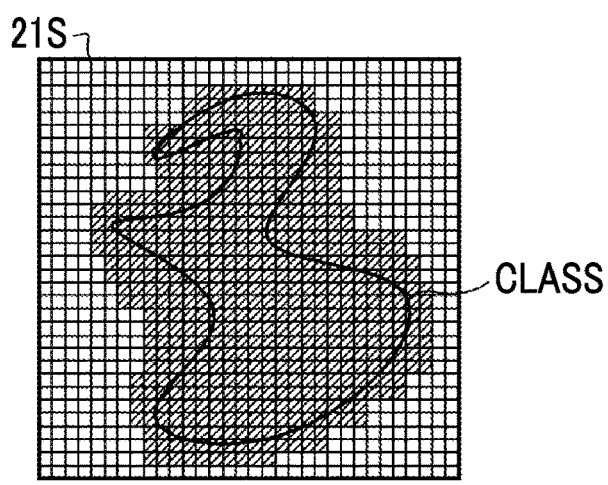

FIGS. 12A to 12C and FIG. 13 illustrate specific examples of processing by the learning data analysis unit 52. FIGS. 12A to 12C illustrate an example of a variation in coloring of the annotation image 21S. Based on the undivided original learning input image 20, while a person determines the class that appeared in the original learning input image 20, the person manually adds an annotation to the determined class region. Thereby, the undivided original annotation image 21 is created. The annotation is added, for example, by coloring the class region. The color is changed for each class type. The coloring is performed using a pen tablet or the like.

FIG. 12A illustrates a learning input image 20S which is a part of the learning input image 20. FIGS. 12B and 12C illustrate an annotation image 21S which is a part of the annotation image 21 created based on the learning input image 20. The region of the learning input image 20S illustrated in FIG. 12A corresponds to the region of the annotation image 21S.

The annotation indicated by hatching in the annotation image 21S illustrated in FIG. 12B is finely colored in units of approximately one pixel, and is faithfully added to a contour line of the class. On the other hand, the annotation indicated by hatching in the annotation image 21S illustrated in FIG. 12C is coarsely colored in units of two pixels to four pixels, and is largely deviated from a contour line of the class.

Since the coloring of the class in the annotation image 21 is manually performed in this way, there is a variation in the coloring. The variation in coloring of the annotation is one of the causes of a mismatch between the frequency bands that the hierarchical model 10 is capable of analyzing and the frequency bands of the classes to be determined in the learning data.

That is, in a case where coloring of the annotation is fine, the feature indicating the class in the annotation image 21S has a high frequency band, and in a case where coloring of the annotation is coarse, the feature indicating the class in the annotation image 21S has a low frequency band. The annotation image 21S is a correct answer image to be compared with the learning output image 14S. Therefore, as in the annotation image 21S illustrated in FIG. 12C, in a case where the frequency band of the class to be determined is low, even in a case where the features of the fine structure are extracted by the hierarchical model 10, it is considered that the features do not contribute to the class determination accuracy.

Therefore, as illustrated in FIG. 13, the learning data analysis unit 52 first analyzes the frequency bands included in the annotation image group 13. The analysis is performed, for example, using a well-known method of analyzing frequency bands based on an image pyramid. The learning data analysis unit 52 generates an image pyramid based on each annotation image 21S included in the annotation image group 13, and analyzes the frequency bands based on the image pyramid. The learning data analysis unit 52 analyzes each annotation image 21S, integrates each analysis result, and outputs an analysis result 61 of the annotation image group 13.

Figure 14:
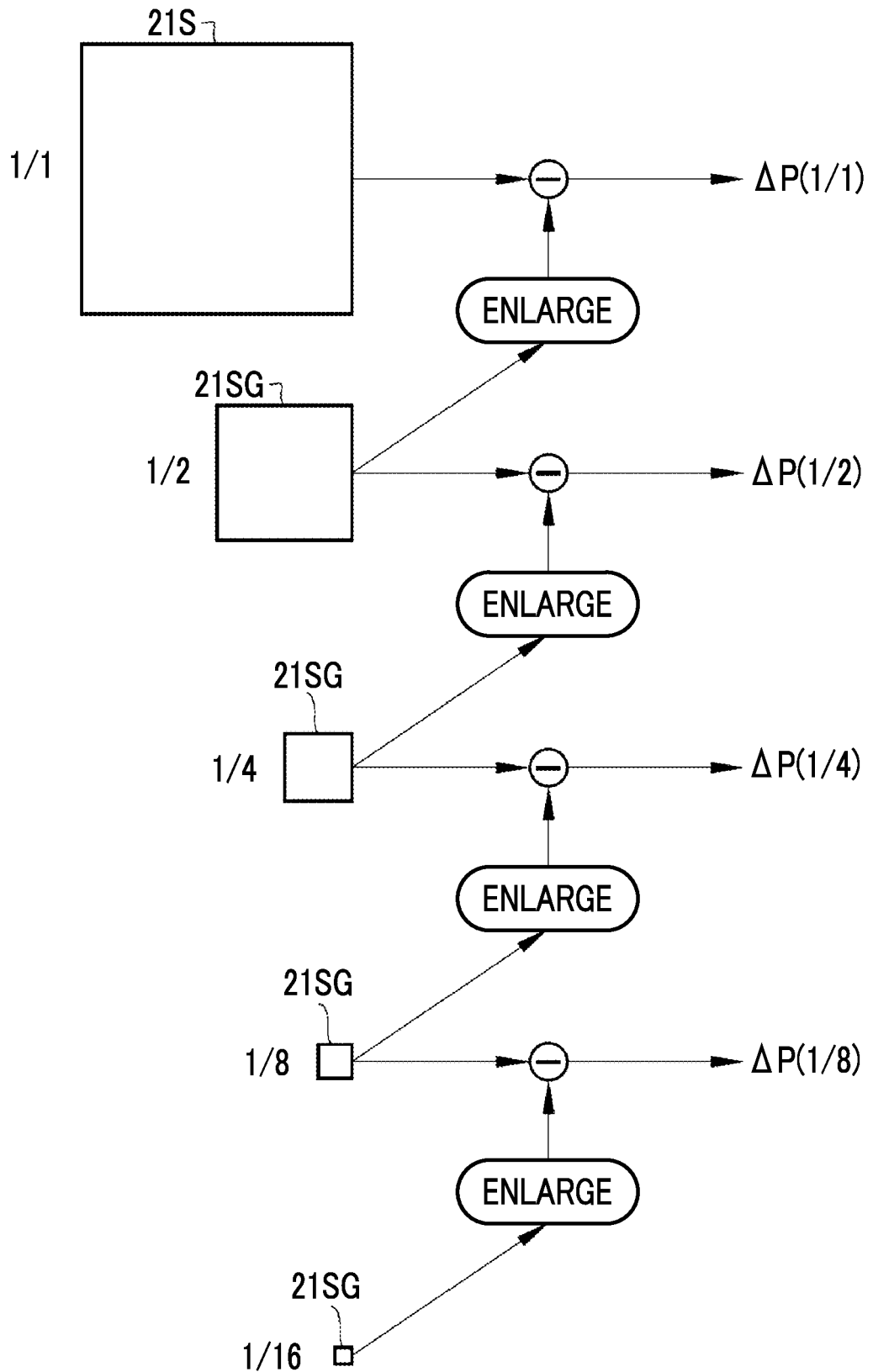
FIG. 14 is a diagram illustrating frequency analysis using an image pyramid.

As illustrated in FIG. 14, the image pyramid includes a plurality of images which are obtained by gradually lowering the resolution of the annotation image 21S and have different resolutions. In FIG. 14, each of images 21SG to which ½, ¼, ⅛, and 1/16 are added is a blurred image obtained by gradually lowering the resolution of the annotation image 21S by using, for example, a Gaussian filter for smoothing an image. The image pyramid including the blurred images 21SG is called a Gaussian pyramid. By gradually lowering the resolution, an image size of each blurred image 21S is reduced to ½, ¼, ⅛, and 1/16.

After generating the image pyramid, the learning data analysis unit 52 calculates a difference ΔP between blurred images 21SG of adjacent image sizes, and evaluates a matching degree of each blurred image 21SG In calculation of the difference ΔP, the learning data analysis unit 52 enlarges, for example, the blurred image 21SG having a smaller image size to a larger image size such that the image sizes of the blurred images 21SG match with each other. In a case of calculating the difference ΔP (⅛) between the blurred image 21SG having an image size of ⅛ and the blurred image 21SG having an image size of 1/16, the blurred image 21SG having a smaller image size of 1/16 is enlarged so as to match with the blurred image 21SG having a larger image size of ⅛. The difference ΔP is, for example, a value obtained by standardizing a total of absolute values of differences between pixel values of each blurred image 21SG via a preset method such that the difference ΔP can be compared.

The difference ΔP of each blurred image 21SG indicates an amount of spatial frequency components of each of the frequency bands included in the annotation image 21S. As the difference ΔP becomes larger, it is evaluated that there are more spatial frequency components of the frequency band corresponding to the image size of the blurred image 21SG For example, the difference ΔP (1/1) between the annotation image 21S having an image size of 1/1 and the blurred image 21SG of which the image size is reduced to ½ indicates an amount of the spatial frequency components of the highest frequency band among the frequency bands included in the annotation image 21S. Similarly, the difference ΔP (½) indicates an amount of the spatial frequency components of the frequency band, which is one step lower than the frequency band in the difference ΔP (1/1). By calculating each difference ΔP (1/1), ΔP (½), ΔP (¼), ΔP (⅛), . . . of each blurred image 21SG in this way, the annotation image 21S, the frequency band included in the annotation image 21S, and the frequency band with a relatively large amount can be recognized.

The learning data analysis unit 52 performs such processing on all of the plurality of annotation images 21S included in the annotation image group 13. An average value of the differences AP calculated for each annotation image 21S is calculated, and the average value is calculated as the difference ΔP of the annotation image group 13 illustrated in FIG. 13.

The learning data analysis unit 52 specifies, among the frequency bands included in the annotation image group 13, a frequency band for which extraction of the image features in the hierarchical model 10 is of relatively high necessity, as a necessary band, based on the differences AP (1/1), ΔP (½), ΔP (¼), . . . , which are calculated based on the image pyramid. For example, the learning data analysis unit 52 specifies, as necessary bands, a preset number of frequency bands in order of high necessity, such as frequency bands from a first frequency band to a fourth frequency band, by comparing each difference ΔP. Alternatively, the learning data analysis unit 52 sets a threshold value, and specifies, as necessary bands, the frequency bands in which the differences AP are equal to or larger than the threshold value.

The learning data analysis unit 52 sets a reference for specifying the necessary band, determines that the frequency band satisfying the reference is "equal to or higher than reference", and determines that the frequency band not satisfying the reference is "lower than reference". The learning data analysis unit 52 specifies the frequency bands determined as "equal to or higher than reference", as necessary bands. The learning data analysis unit 52 outputs an analysis result 61 including the contents. In the analysis result 61 illustrated in FIG. 13, the frequency bands corresponding to the image sizes of 1/1 and ⅛ are determined as "lower than reference", and the other frequency bands are determined as "equal to or higher than reference" and are specified as necessary bands (in FIG. 13, simply indicated as "necessary").

Figure 15:
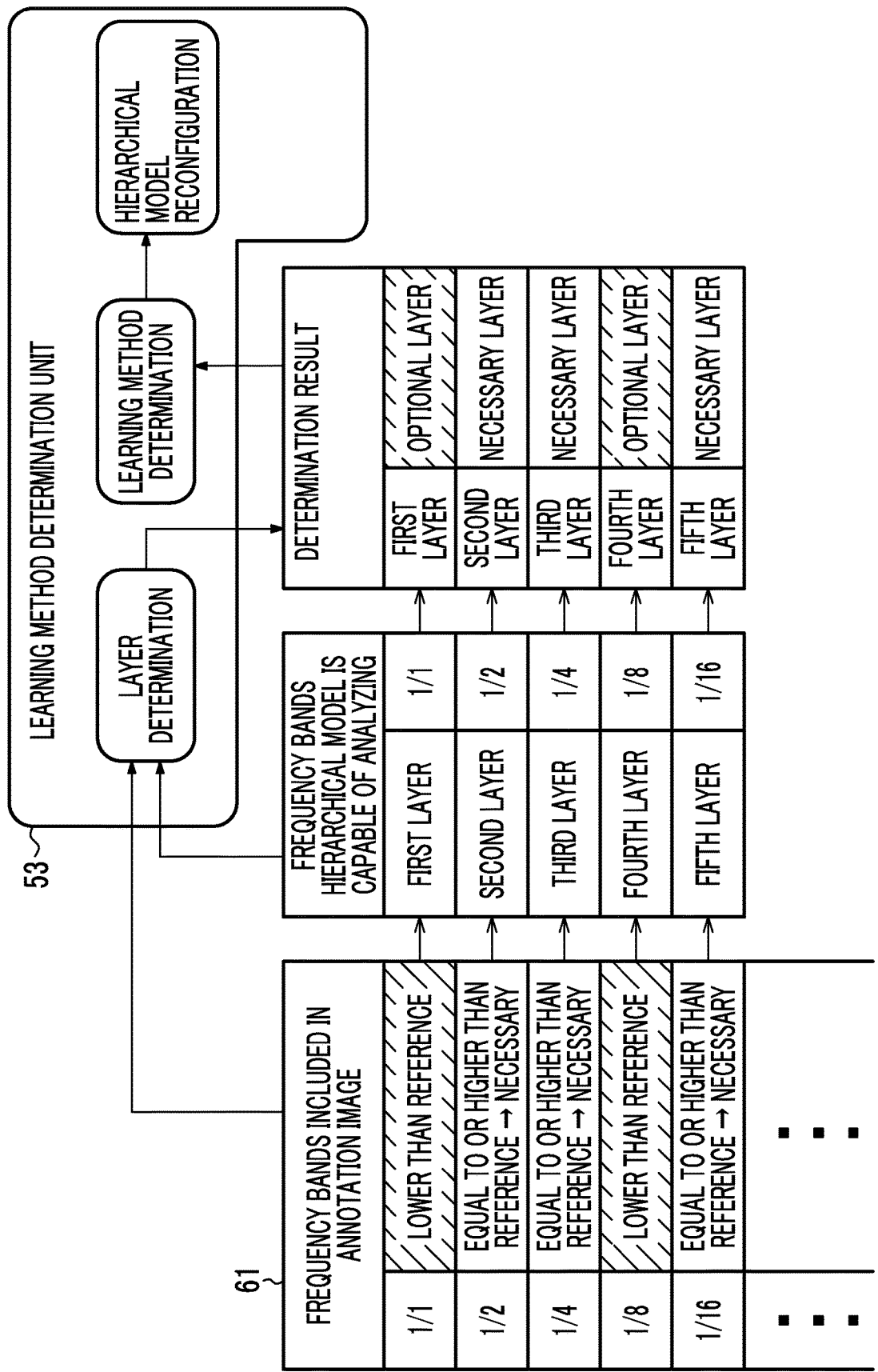
FIG. 15 is a diagram illustrating a specific example of processing of determining a learning method.

FIG. 15 illustrates a specific example of processing in a case where the hierarchical model 10 is reconfigured by the learning method determination unit 53. The learning method determination unit 53 reconfigures the hierarchical model 10 based on the analysis result 61. In the reconfiguration of the hierarchical model 10, first, the learning method determination unit 53 performs layer determination of determining a necessary layer which is necessary for learning and an optional layer which is optional in learning, among the plurality of layers of the hierarchical model 10, based on the necessary band specified in the analysis result 61.

More specifically, the learning method determination unit 53 compares the analysis result 61 with the frequency bands that the hierarchical model 10 is capable of analyzing. The learning method determination unit 53 determines that a layer corresponding to the necessary band specified in the analysis result 61 is a necessary layer. Further, the learning method determination unit 53 determines that a layer corresponding to the frequency band determined as "lower than reference" in the analysis result 61 is an optional layer. In the example illustrated in FIG. 15, in the analysis result 61, the frequency bands corresponding to the image sizes of ½, ¼, and ¹⁄₁₆ are specified as the necessary bands, and the frequency bands corresponding to the image sizes of 1/1 and ⅛ are determined as "lower than reference". Therefore, the learning method determination unit 53 determines the second layer, the third layer, and the fifth layer of the hierarchical model 10, which correspond to the specified three necessary bands, as necessary layers, and determines the first layer and the fourth layer, as optional layers.

The learning method determination unit 53 determines a learning method based on a determination result of the layer determination. In this example, the learning method determination unit 53 determines a learning method of reconfiguring the hierarchical model 10 and performing learning. The learning method determination unit 53 determines specific contents of the reconfiguration of the hierarchical model 10. The contents of the reconfiguration are, for example, reducing a processing amount of the optional layer to be smaller than a processing amount of the necessary layer.

Figure 16:
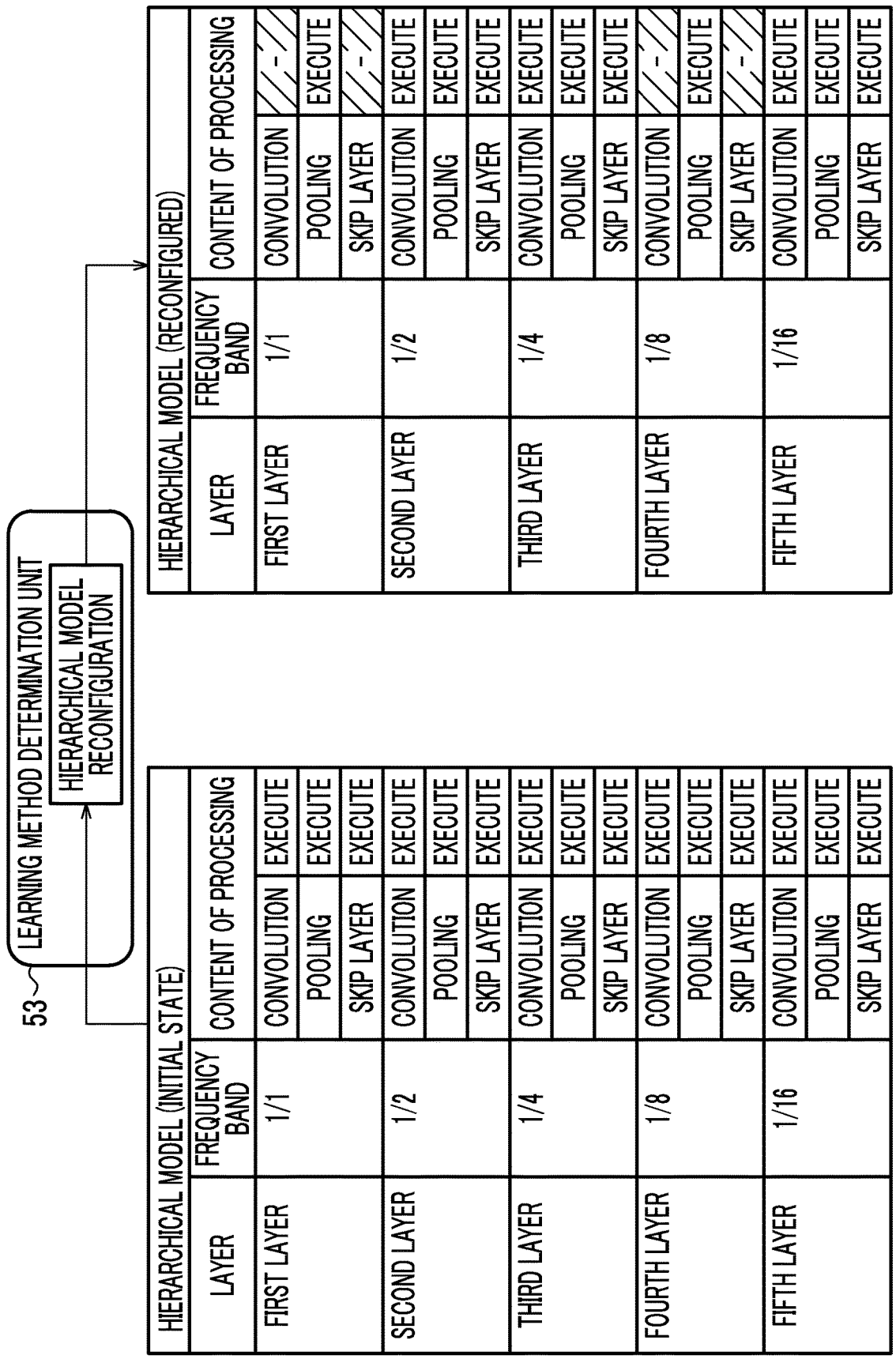
FIG. 16 is a diagram illustrating a specific example of reconfiguration of a hierarchical model.

FIG. 16 illustrates a specific example of the contents of the reconfiguration of the hierarchical model 10. As illustrated in FIG. 6, in each layer of the encoder network 10A of the hierarchical model 10, convolution processing, pooling processing, and skip layer processing are performed. As illustrated in the left table of FIG. 16, in an initial state of the hierarchical model 10, in all layers from the first layer to the fifth layer, execution of three pieces of processing including convolution processing, pooling processing, and skip layer processing is set.

For the processing, the learning method determination unit 53 reduces a processing amount of the optional layer to be smaller than a processing amount of the necessary layer. The right table illustrated in FIG. 16 illustrates an example of the reconfigured contents of the hierarchical model 10. The contents of the reconfiguration of the hierarchical model 10 are set in advance. For example, data in which setting contents are recorded is stored in the storage device 30, as data associated with the operation program.

As illustrated in the reconfigured contents of the right table of FIG. 16, the learning method determination unit 53 sets execution of the three pieces of processing, for the three necessary layers of the second layer, the third layer, and the fifth layer, as in the initial state. On the other hand, for the optional layers of the first layer and the fourth layer, the learning method determination unit 53 sets omission of convolution processing and skip layer processing, and sets execution of only pooling processing.

Figure 17:
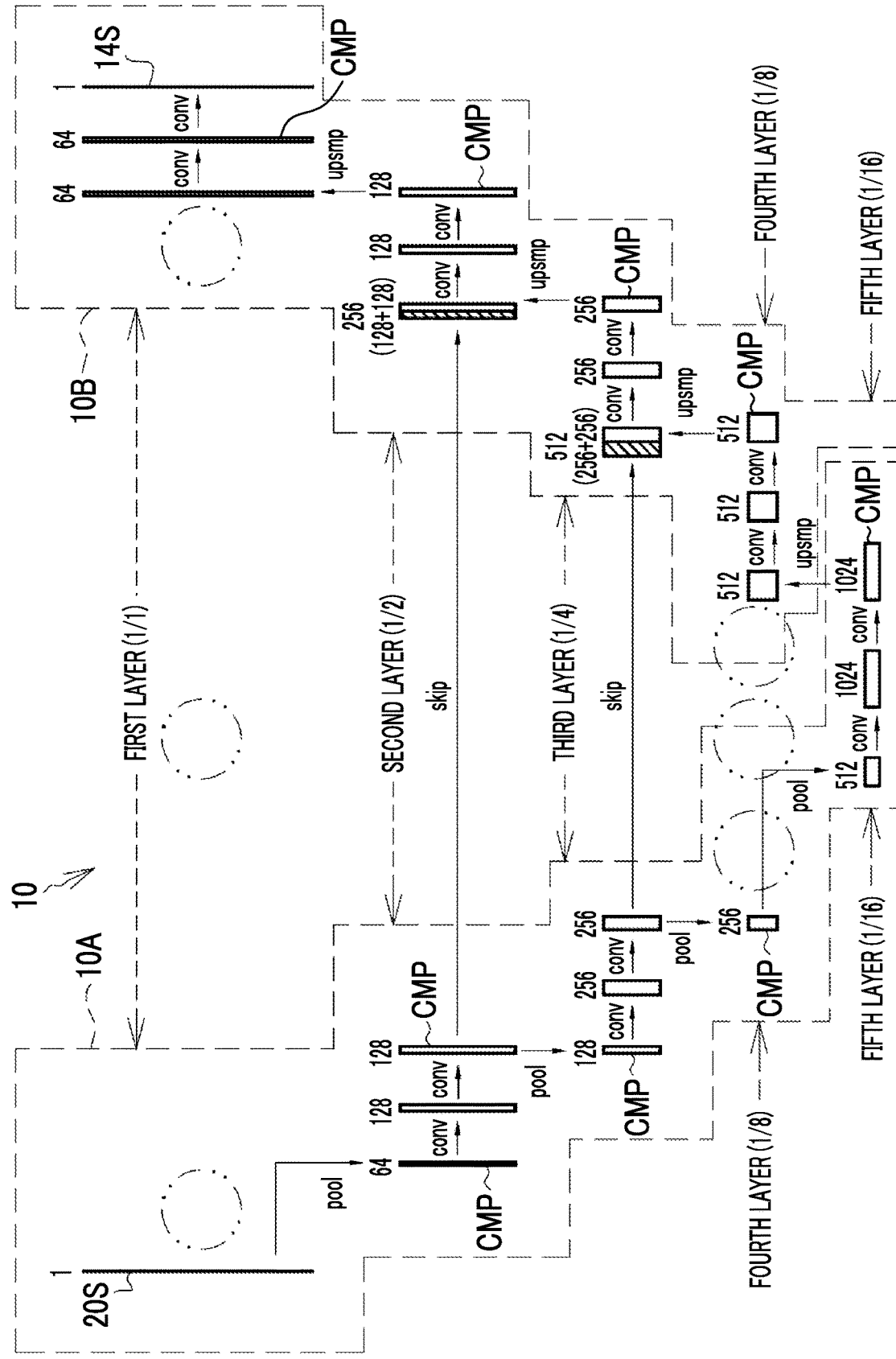
FIG. 17 is a diagram illustrating a specific example of processing of a reconfigured hierarchical model.

FIG. 17 illustrates an example of the hierarchical model 10 reconfigured with the contents illustrated in the right table of FIG. 16. In FIG. 17, for ease of contrast with FIG. 6, a portion of the omitted processing is indicated by a circle with a two-dot chain line. First, in the first layer of the encoder network 10A, convolution processing and skip layer processing are omitted. The skip layer processing is processing of transmitting the image feature map CMP extracted in the first layer to the decoder network 10B. For this reason, in a case where the skip layer processing is omitted, in the first layer of the decoder network 10B, there is no image feature map CMP received from the encoder network 10A. Thus, merging processing is also omitted.

Similarly, in the fourth layer, convolution processing and skip layer processing are omitted in the encoder network 10A, and as a result, merging processing in the decoder network 10B is also omitted.

Next, an operation according to the configuration will be described with reference to flowcharts illustrated in FIGS. 18 to 20. First, in a case where the operation program which is one of the AP 30A is started, as illustrated in FIG. 11, the CPU 32 of the computer including the learning apparatus 2 functions as each of the processing units 51 to 57.

Figure 18:
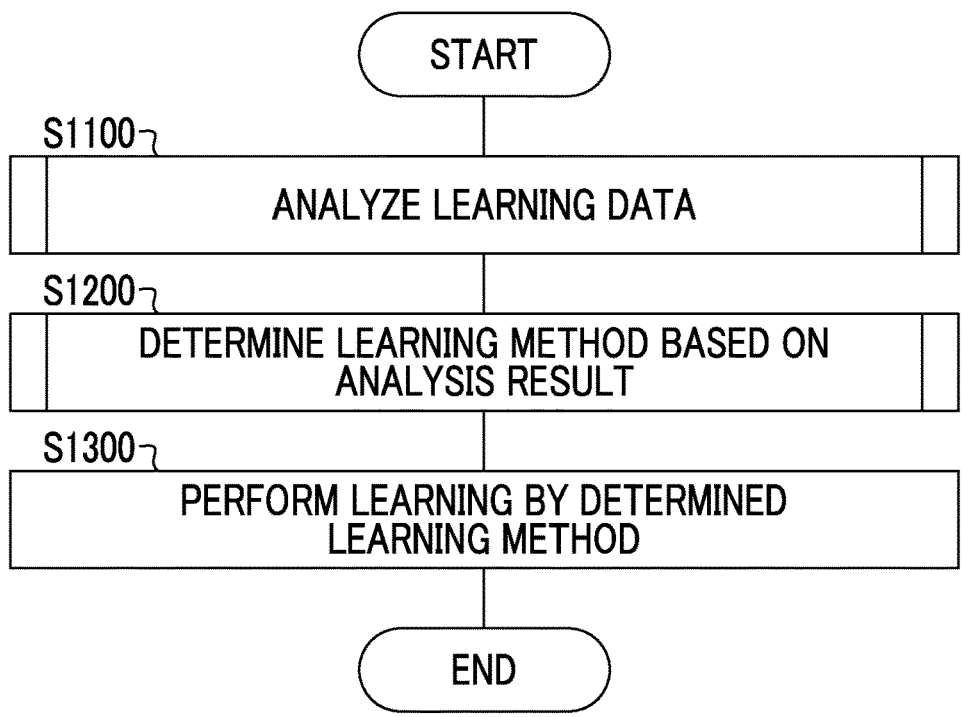
FIG. 18 is a flowchart illustrating a learning processing procedure of the learning apparatus.

As illustrated in step S1100 of FIG. 18, the learning apparatus 2 analyzes the learning data. In step S1200, the learning apparatus 2 determines a learning method based on an analysis result of the learning data. In step S1300, learning is performed by the determined learning method.

Figure 19:
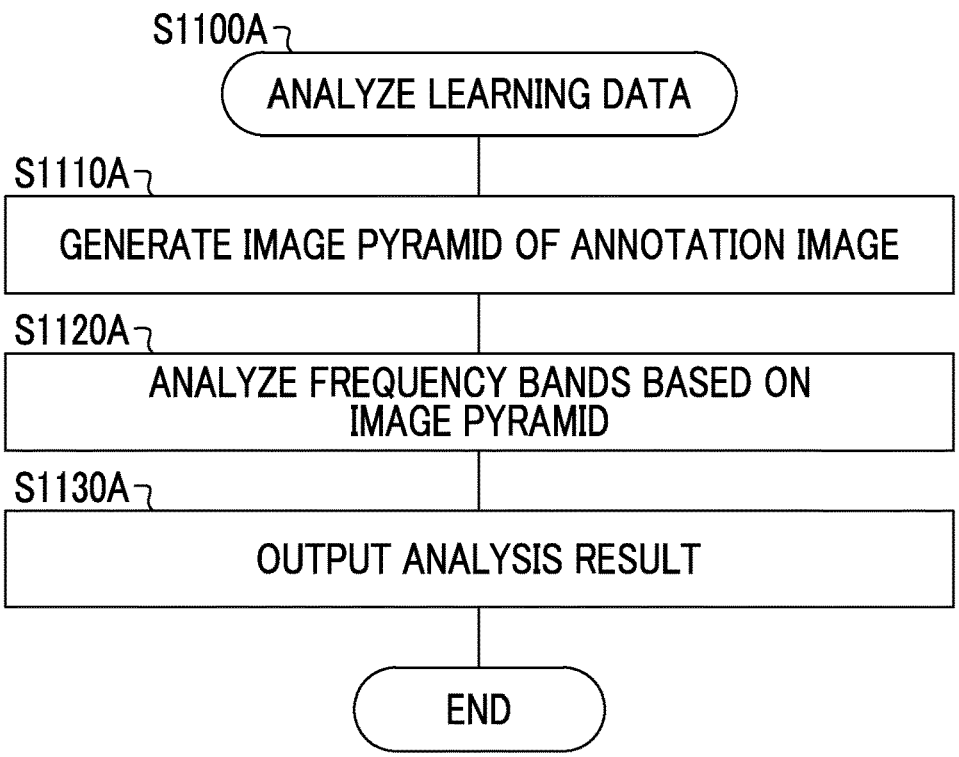
FIG. 19 is a flowchart illustrating a processing procedure of frequency analysis.

As illustrated in FIG. 19, in this example, step S1100 of FIG. 18 is performed according to a procedure of step 1100A. The learning data analysis unit 52 acquires the annotation image group 13 from the mini-batch data 11. In step S1110A, the learning data analysis unit 52 generates an image pyramid for each annotation image 21S included in the acquired annotation image group 13, as illustrated in FIG. 14. In step S1120A, the frequency bands included in each annotation image 21S are analyzed based on the image pyramid. The learning data analysis unit 52 calculates the difference ΔP corresponding to each frequency band, based on the image pyramid. In step S1130A, the learning data analysis unit 52 calculates an average value of the differences AP calculated based on each annotation image 21S, sets the average value as the difference ΔP of the annotation image group 13, and outputs the analysis result 61 based on the difference ΔP.

Figure 20:
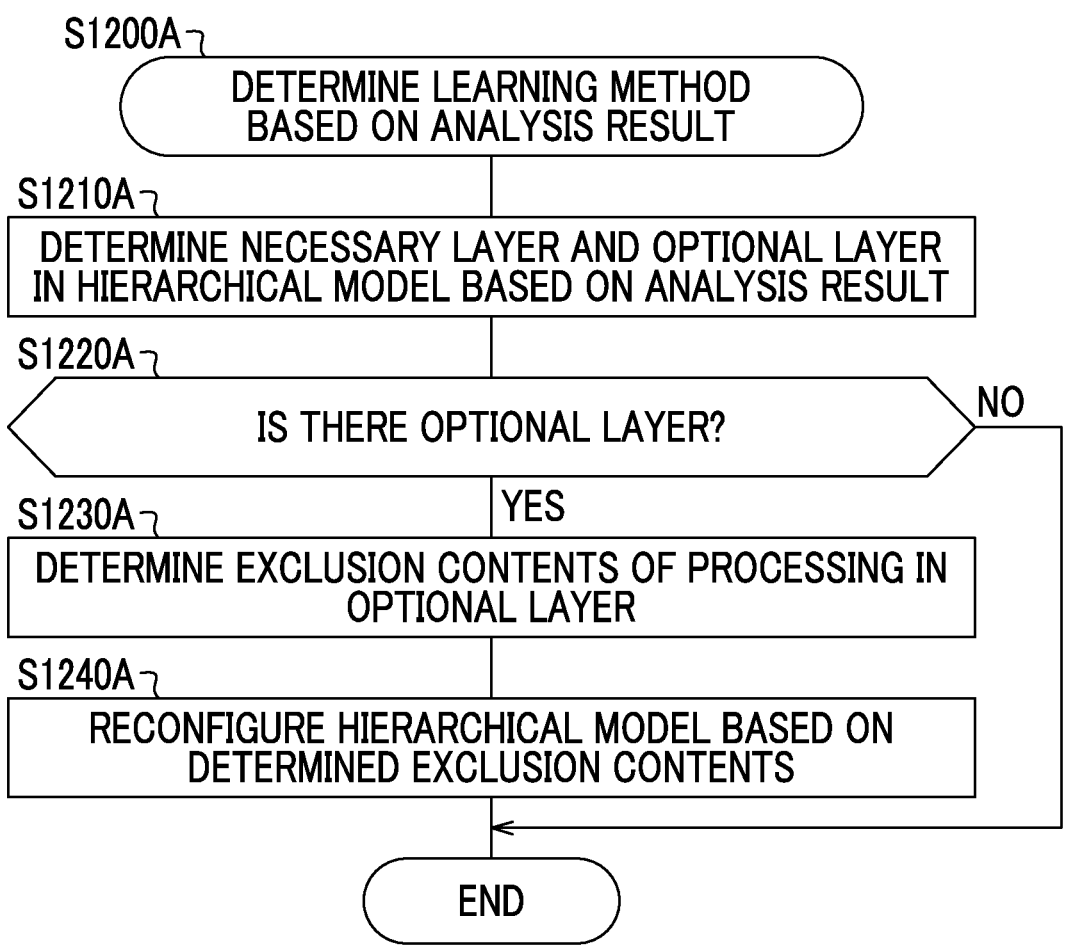
FIG. 20 is a flowchart illustrating a processing procedure of determining a learning method.

As illustrated in FIG. 20, in this example, step S1200 of FIG. 18 is performed according to a procedure of step S1200A. In step S1210A, the learning method determination unit 53 determines the necessary layer and the optional layer in the hierarchical model 10 based on the analysis result 61. As illustrated in FIG. 15, the learning method determination unit 53 determines the necessary layer and the optional layer by comparing the analysis result 61 with the frequency bands that the hierarchical model 10 is capable of analyzing, and outputs the determination result.

In the analysis result 61 illustrated in FIG. 15, the frequency bands other than the frequency bands corresponding to the image sizes of 1/1 and ¼ are specified as necessary bands. The learning method determination unit 53 determines the first layer and the fourth layer as optional layers according to the analysis result 61, determines the other layers as necessary layers, and outputs the determination result.

In step S1220A, the learning method determination unit 53 determines the presence or absence of the optional layer based on the determination result. In a case where it is determined that there is no optional layer (NO in step S1220A), the learning method determination unit 53 determines to perform learning using the hierarchical model 10 in the initial state without reconfiguring the hierarchical model 10.

On the other hand, in step S1220A, in a case where it is determined that there is an optional layer (YES in step S1220A), the learning method determination unit 53 reconfigures the hierarchical model 10. Specifically, first, in step S1230A, the learning method determination unit 53 reads, from the storage device 30, data in which exclusion contents of the right table of FIG. 16 are defined, and determines exclusion contents in the processing of the optional layer. In step S1240A, the learning method determination unit 53 reconfigures the hierarchical model 10 based on the determined exclusion contents. In the example illustrated in FIG. 16, convolution processing and skip layer processing in the first layer and the fourth layer of the encoder network 10A are omitted.

In step S1300 of FIG. 18, the learning unit 54 acquires the learning input image group 12 from the mini-batch data 11, inputs the acquired learning input image group 12, in a case where the hierarchical model 10 is reconfigured, to the reconfigured hierarchical model 10, and learns the hierarchical model 10. The hierarchical model 10 outputs the learning output image 14S for each learning input image 20S. In a case where one learning input image group 12 is learned, the learning unit 54 outputs the learning output image group 14 to the evaluation unit 56.

The evaluation unit 56 evaluates the class determination accuracy of the hierarchical model 10 by comparing the learning output image group 14 with the annotation image group 13 from the mini-batch data 11. The update unit 57 updates parameters such as the coefficients of the filter F of the hierarchical model 10 based on the evaluation result which is output from the evaluation unit 56. Such learning is repeated for the number of the generated mini-batch data 11.

In this way, in the learning apparatus 2, the learning data analysis unit 52 analyzes the frequency bands included in the annotation image 21S. The learning method determination unit 53 determines a learning method using the learning input image 20S corresponding to the learning data, based on the analysis result 61 of the frequency bands by the learning data analysis unit 52. The learning unit 54 learns the hierarchical model 10 via the determined learning method using the learning input image 20S. In this example, the hierarchical model 10 is reconfigured based on the analysis result 61, and the hierarchical model 10 is learned.

Therefore, a mismatch between the frequency bands of the classes to be determined in the annotation image 21S corresponding to the learning data and the frequency bands that the hierarchical model 10 is capable of analyzing is prevented. Further, in the unnecessary layer which does not contribute to improvement of the class determination accuracy, processing is omitted. Thereby, it is possible to appropriately determine classes and eliminate wasteful calculation processing.

Further, the learning data analysis unit 52 specifies the frequency band for which extraction of the feature is of relatively high necessity among the frequency bands, as a necessary band, by analyzing the frequency bands included in the annotation image 21S. The learning method determination unit 53 reconfigures the hierarchical model 10 based on the specified frequency band (necessary band). Since the hierarchical model 10 is reconfigured based on the necessary band, the necessary band is appropriately analyzed, and thus determination of the class is appropriately and more reliably performed.

Further, in the reconfiguration of the hierarchical model 10, the learning method determination unit 53 determines a necessary layer which is necessary for learning and an optional layer which is optional in learning, among the plurality of layers of the hierarchical model 10, based on the specified frequency band (necessary band). Thus, a processing amount of the optional layer is reduced to be smaller than a processing amount of the necessary layer. Therefore, as will be described later, an effect of eliminating wasteful calculation processing is greater than in a case of simply reducing an amount of data of an input image, such as lowering the resolution of the learning input image 20S. This is because, in the learning of the hierarchical model 10, an amount of data of the hierarchical model 10 is overwhelmingly larger than an amount of data of the input image. Therefore, it is possible to significantly reduce a consumption of the memory 31 and shorten a calculation time.

Further, in this example, the learning data analysis unit 52 generates the image pyramid including the plurality of blurred images 21SG which are obtained by gradually lowering the resolution of the annotation image 21S and have different resolutions. The frequency bands included in the annotation image 21S are analyzed based on the image pyramid. By using the image pyramid, it is possible to gradually analyze the frequency bands. The analysis of the frequency bands that the hierarchical model 10 is capable of analyzing is also gradually performed. Therefore, it is easier to match the frequency bands of the image pyramid with the frequency bands of each layer of the hierarchical model 10, as compared with a case of analyzing the frequency bands by, for example, a Fourier transform.

The reason is as follows. In the Fourier transform, a spectrum of spatial frequencies is obtained as an analysis result of frequency bands. On the other hand, since the spectrum includes continuous values, in order to match the spectrum with the hierarchical model 10 in which the frequency bands are gradually changed, it takes more time and effort.

Further, in this example, an example of analyzing the frequency bands based on the difference ΔP of each blurred image 21SG of the image pyramid has been described. On the other hand, as a method of analyzing the frequency bands, in addition to the method using the difference ΔP, for example, a method of analyzing the frequency bands by using an area matching degree or a correlation coefficient of each blurred image 21SG may be used. These methods may be adopted.

Of course, although it takes more time as compared with the case of analyzing the frequency bands using the image pyramid, the frequency bands can be analyzed by the Fourier transform. Thus, the Fourier transform may be used instead of the image pyramid. In a case where the Fourier transform is used, for example, the learning data analysis unit 52 selects a predetermined number of frequency bands having high intensities in the spatial frequency spectrum of the annotation image 21S in order of high intensity. In this case, the selected frequency bands are determined as frequency bands equal to or higher than the reference, and the other frequency bands are determined as frequency bands lower than the reference.

Further, the hierarchical model 10 is configured with the convolutional neural network CNN including the encoder network 10A and the decoder network 10B. The convolutional neural network CNN has a high reliability, and thus is widely used in a case of performing semantic segmentation. Therefore, by using the convolutional neural network CNN as the hierarchical model 10, semantic segmentation having a high reliability can be realized.

The hierarchical model 10 illustrated in FIG. 6 is an example, and the size of the filter F (in the example of FIG. 7, 3×3), the number of the filters F (the number of channels), the reduction rate of the image size of each layer, and the number of the layers may be changed as appropriate. Further, the image size of the image feature map CMP is the same before and after the convolution processing. On the other hand, the image size of the image feature map CMP may be slightly reduced after the convolution processing. Further, in the example illustrated in FIG. 6, in the same layer of the encoder network 10A and the decoder network 10B, the image sizes completely match with each other. On the other hand, the image sizes may not completely match with each other. For example, in a case of comparing the same layer of the encoder network 10A and the decoder network 10B, the image size of the decoder network 10B may be slightly smaller. In this way, various parameters and the like of the hierarchical model 10 may be changed as appropriate.

Modification Example of Reconfiguration of Hierarchical Model

Figure 21:
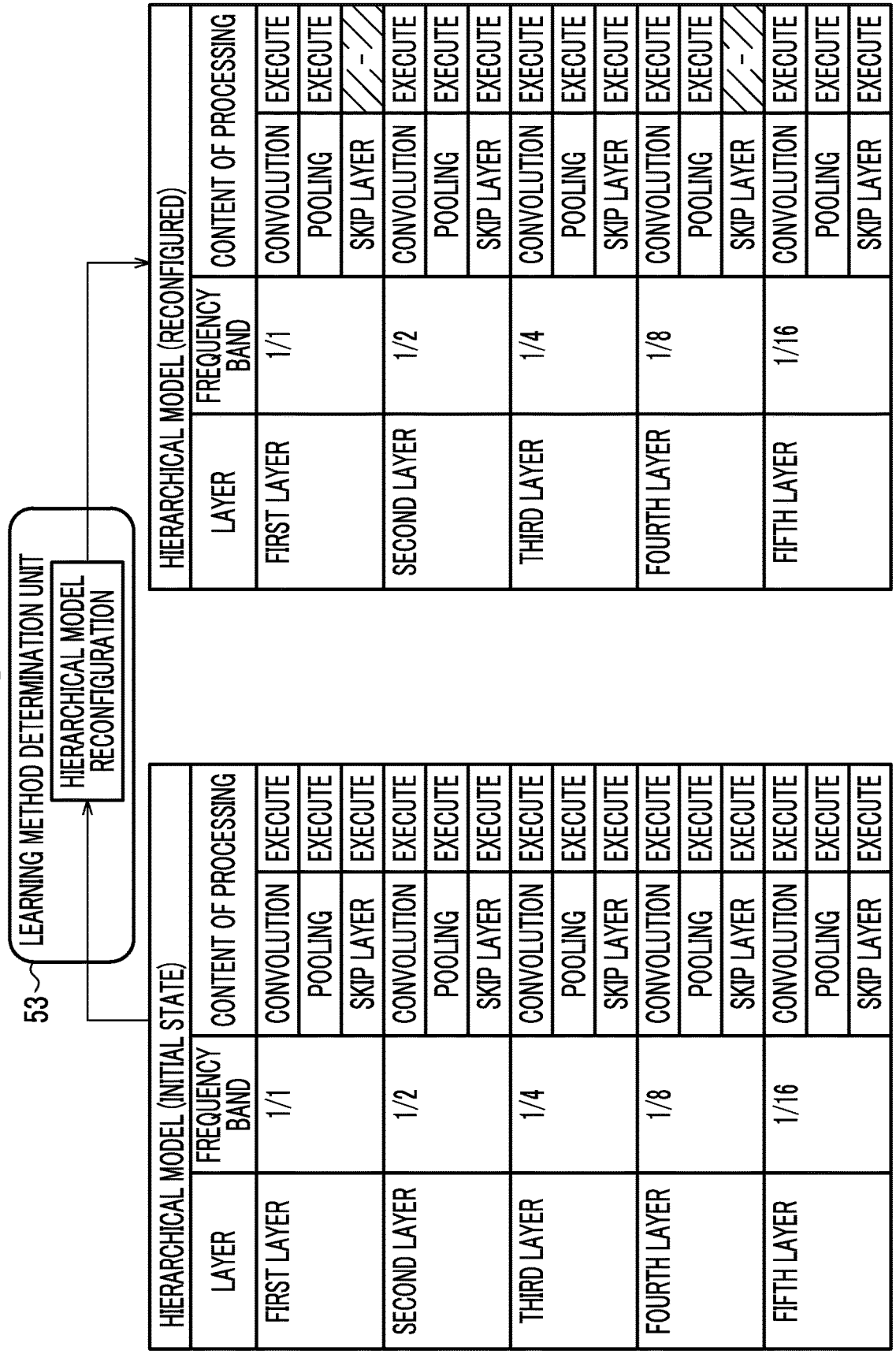
FIG. 21 is a diagram illustrating a modification example of reconfiguration of a hierarchical model.

In the example illustrated in FIG. 16, in the reconfiguration of the hierarchical model 10, for the exclusion contents in the processing of the optional layer, an example of omitting both convolution processing and skip layer processing has been described. On the other hand, the exclusion contents are not limited to the above example, and, for example, as in a modification example illustrated in FIG. 21, only skip layer processing may be omitted without omission of convolution processing. In FIG. 21, as in the example illustrated in FIG. 16, the optional layers are the first layer and the fourth layer.

Figure 22:
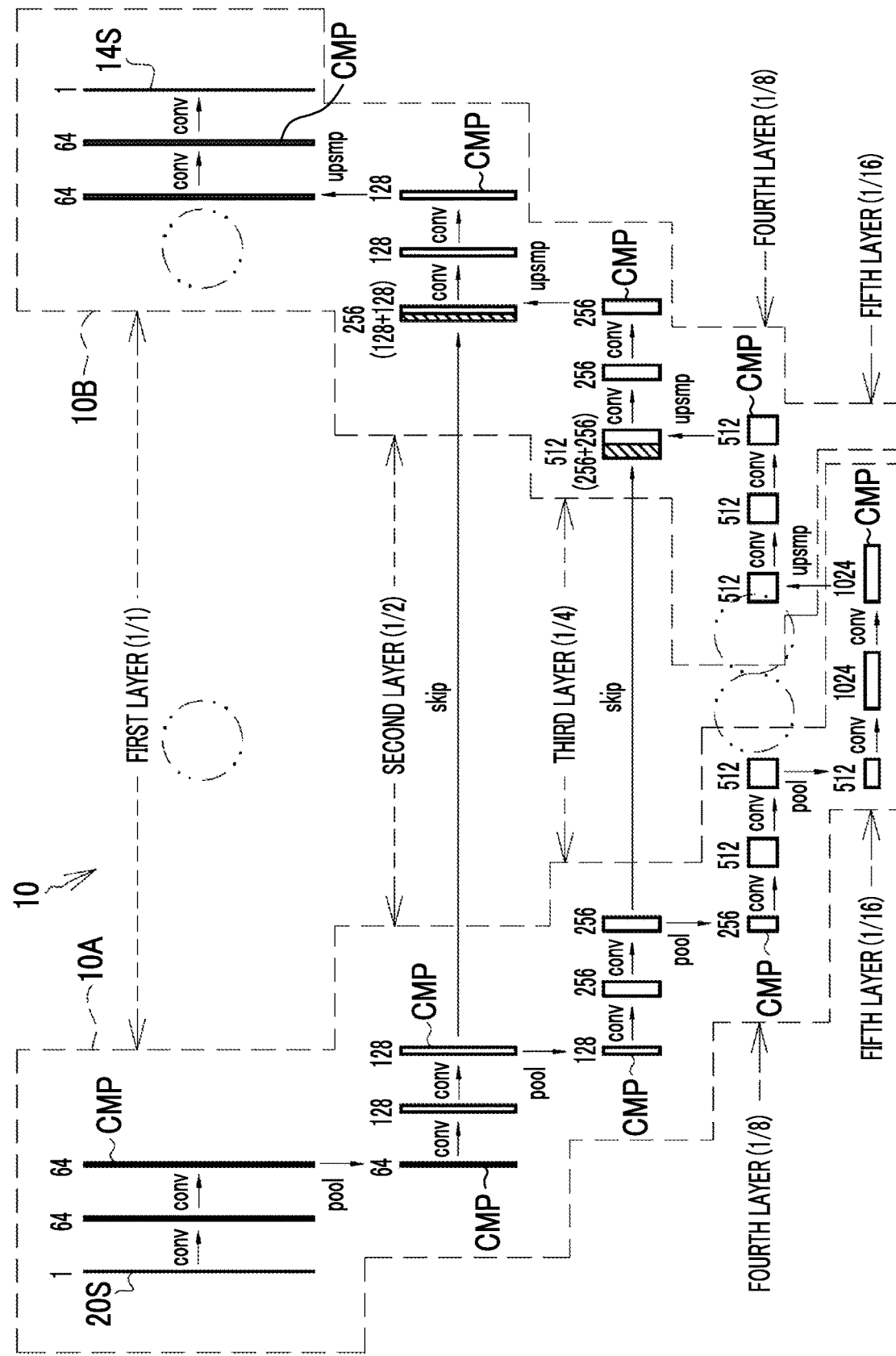
FIG. 22 is a diagram illustrating a specific example of processing of a reconfigured hierarchical model corresponding to the modification example of FIG. 21.

In this case, as illustrated in FIG. 22, in the first layer and the fourth layer of the encoder network 10A, convolution processing is performed. On the other hand, as indicated by a circle with a two-dot chain line, skip layer processing is not performed. Further, since skip layer processing is omitted, in the first layer and the fourth layer of the decoder network 10B, as indicated by a circle with a two-dot chain line, merging processing is also omitted.

In this way, in a case where convolution processing is performed in the optional layer, the feature extraction is likely to be appropriately performed in the next layer in accordance with the convolution processing. This is because the convolution processing makes the image features clear in the image feature map CMP which is to be output to the next layer. Of course, in the modification example illustrated in FIGS. 21 and 22, since convolution processing is not omitted, an effect of eliminating wasteful calculation processing is reduced as compared with the case of FIG. 16.

Second Embodiment

Figure 23:
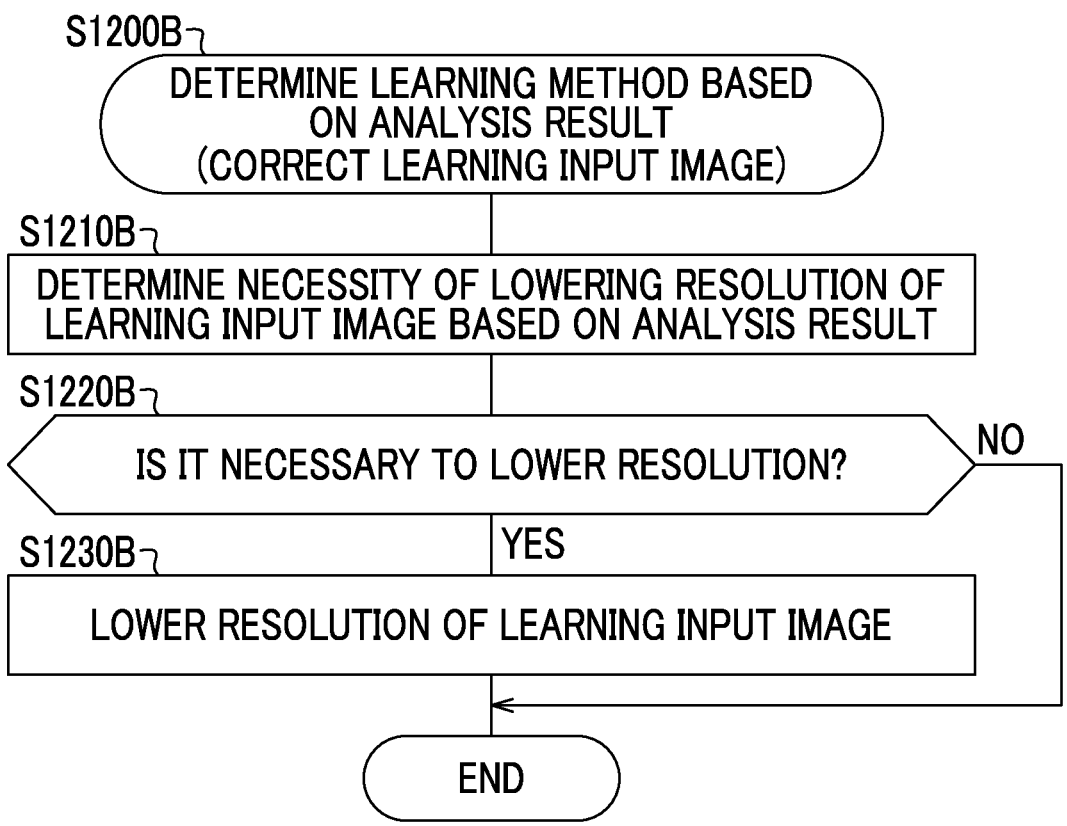
FIG. 23 is a flowchart illustrating a processing procedure of determining a learning method according to a second embodiment.
Figure 24:
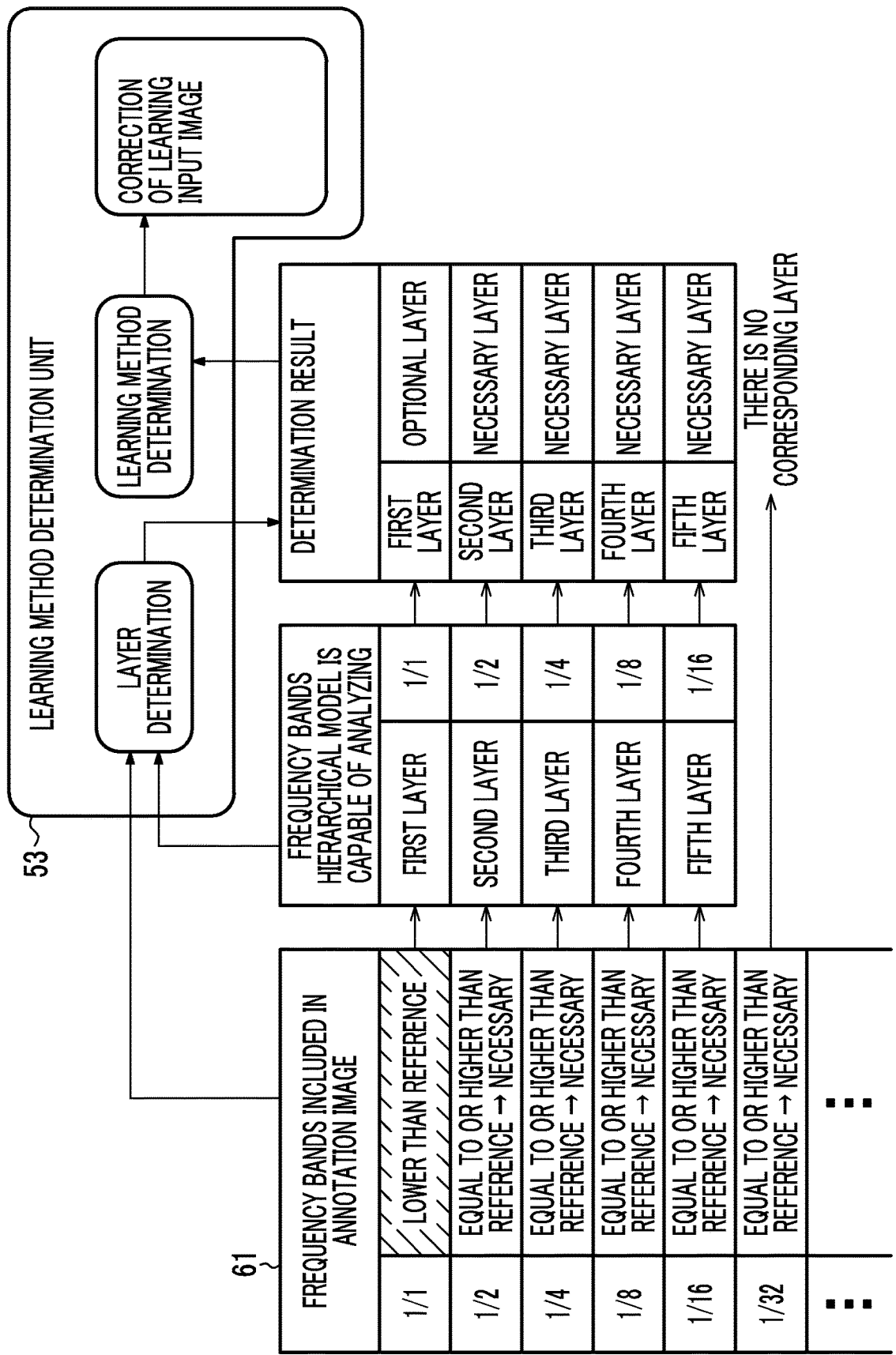
FIG. 24 is a diagram illustrating a specific example of processing of determining a learning method according to the second embodiment.
Figure 25:
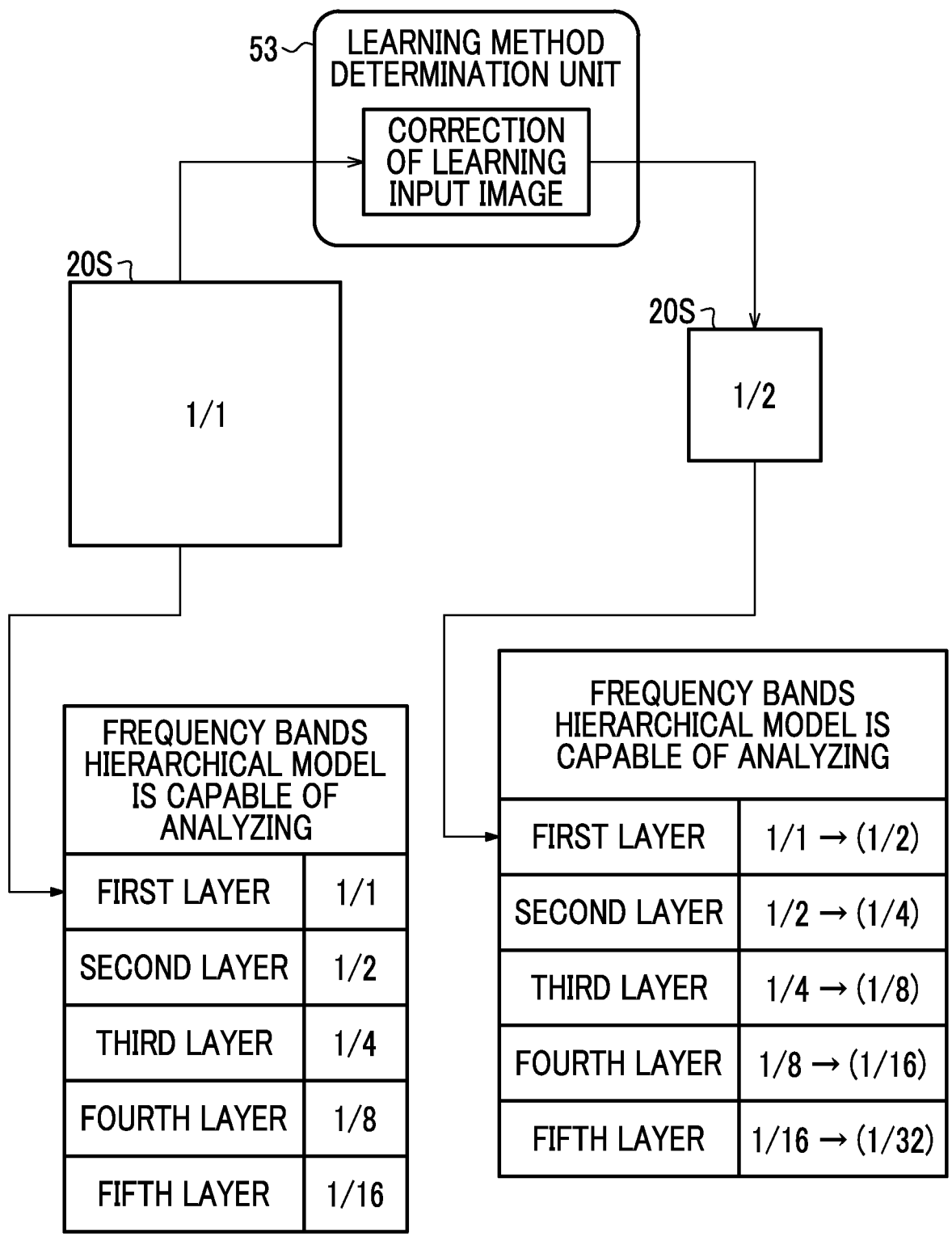
FIG. 25 is a diagram illustrating a specific example of correction of the learning input image according to the second embodiment.

The second embodiment illustrated in FIGS. 23 to 25 is an example in which the learning method determination unit 53 determines a learning method of lowering the resolution of the learning input image 20S and performing learning without reconfiguring the hierarchical model 10. In the second and subsequent embodiments, descriptions of the same configurations and the same contents as those of the first embodiment will be omitted, and differences will be mainly described.

In the second embodiment, for step S1200 illustrated in FIG. 18, processing of step S1200B illustrated in FIG. 23 is executed instead of step S1200A illustrated in FIG. 20 according to the first embodiment.

In the second embodiment, as in the first embodiment, before step S1200B, the learning data analysis unit 52 performs learning data analysis illustrated in step S1100 of FIG. 18. Specifically, the learning data analysis unit 52 specifies the frequency band for which extraction of the feature is of relatively high necessity among the frequency bands by analyzing the frequency bands included in the annotation image 21S of the learning data, and outputs the analysis result 61.

In processing of step S1200B illustrated in FIG. 23, first, in step S1210B, the learning method determination unit 53 determines a necessity of lowering the resolution of the learning input image 20S based on the analysis result 61. In a case where the learning method determination unit 53 determines that it is necessary to lower the resolution (YES in step 1220B), in step S1230B, the learning method determination unit 53 lowers the resolution of the learning input image 20S.

FIG. 24 illustrates a specific example in which the learning method determination unit 53 determines that it is necessary to lower the resolution of the learning input image 20S. In the analysis result 61 illustrated in FIG. 24, among the frequency bands included in the annotation image 21S, only the frequency band corresponding to the image size of 1/1 is determined as "lower than reference", and the frequency bands corresponding to the image sizes of ½ to 1/32 are determined as "equal to or higher than reference" and are specified as the necessary band.

On the other hand, for the frequency band corresponding to an image size of 1/32 that is specified as the necessary band in the analysis result 61 illustrated in FIG. 24, in the hierarchical model 10 in which a lower limit of the analyzable frequency bands is the frequency band corresponding to an image size of 1/16, there is no corresponding layer. This means that a range of the frequency bands that the hierarchical model 10 is capable of analyzing does not include the necessary band which is necessary to extract the features. Even in this case, the frequency bands of the classes to be determined in the learning data and the frequency bands that the hierarchical model 10 is capable of analyzing are mismatched.

In such a case, the learning method determination unit 53 determines a learning method of performing correction for lowering the resolution of the learning input image 20S and performing learning.

As illustrated in FIG. 25, the learning method determination unit 53 reduces the image size of the learning input image 20S to ½ by lowering the resolution of the learning input image 20S. Thereby, the learning input image 20S having an image size of ½ is input to the first layer of the hierarchical model 10 to which the learning input image 20S having an image size of 1/1 is to be originally input. Therefore, the frequency band that the lowest fifth layer of the hierarchical model 10 is capable of analyzing is substantially changed from the frequency band corresponding to the image size of 1/16 to the frequency band corresponding to the image size of 1/32.

In this example, the frequency bands included in the annotation image 21S do not include the frequency band corresponding to the image size of 1/1. For this reason, analysis of the features of the fine structure of the learning input image 20S is unnecessary. In the hierarchical model 10, analysis of the learning data is performed starting from analysis of the learning input image 20S having the lowest resolution. Thus, analysis of the fine structure which is unnecessary for the class determination is omitted. In addition, in a case where the range of the frequency bands that the hierarchical model 10 is capable of analyzing is determined, by lowering the resolution of the learning input image 20S, the analyzable frequency band in the lowest layer is lowered. Thereby, it is possible to analyze the features of the coarse structure such as the frequency band corresponding to the image size of ¹⁄₃₂.

In this way, by performing correction for lowering the resolution of the learning input image 20S, the learning method determination unit 53 can match the range of the frequency bands included in the annotation image 21S with the range of the frequency bands that the hierarchical model 10 is capable of analyzing. Thereby, according to the second embodiment, it is possible to appropriately determine the class.

Third Embodiment

Figure 26:
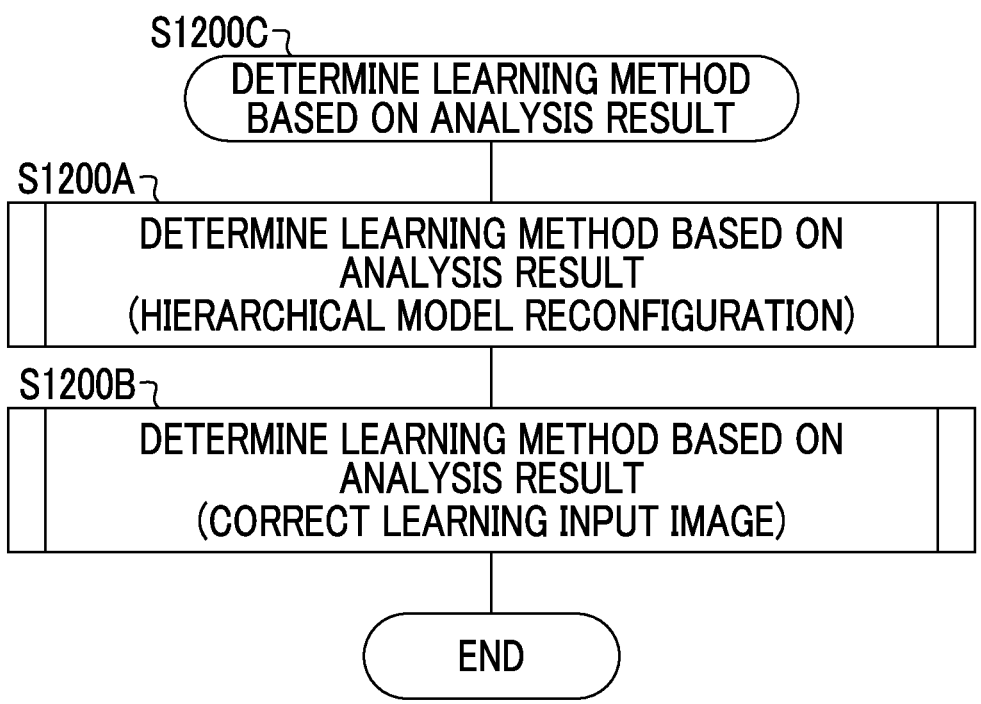
FIG. 26 is a flowchart illustrating a processing procedure of determining a learning method according to a third embodiment.
Figure 27:
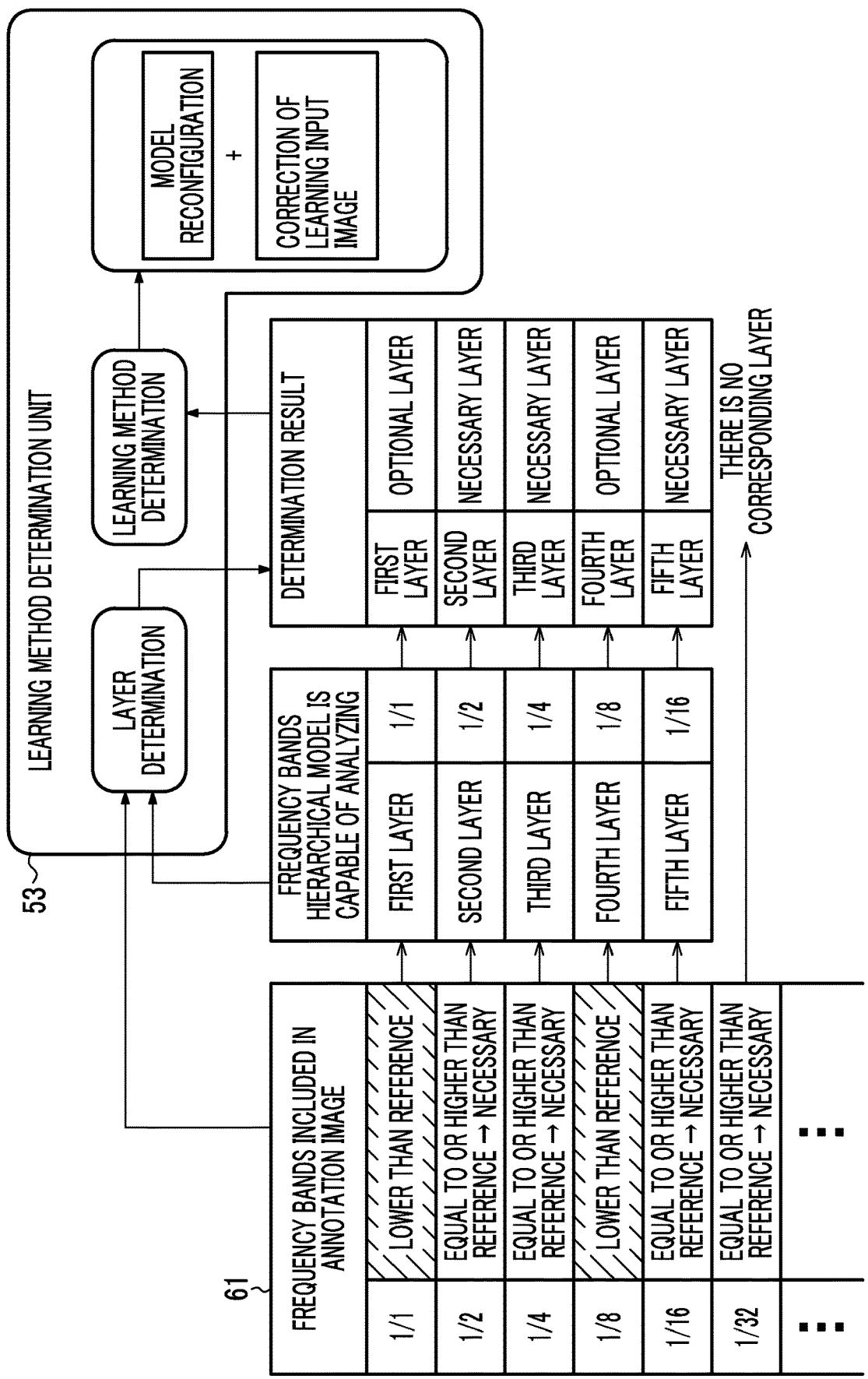
FIG. 27 is a diagram illustrating a specific example of processing of determining a learning method according to the third embodiment.
Figure 28:
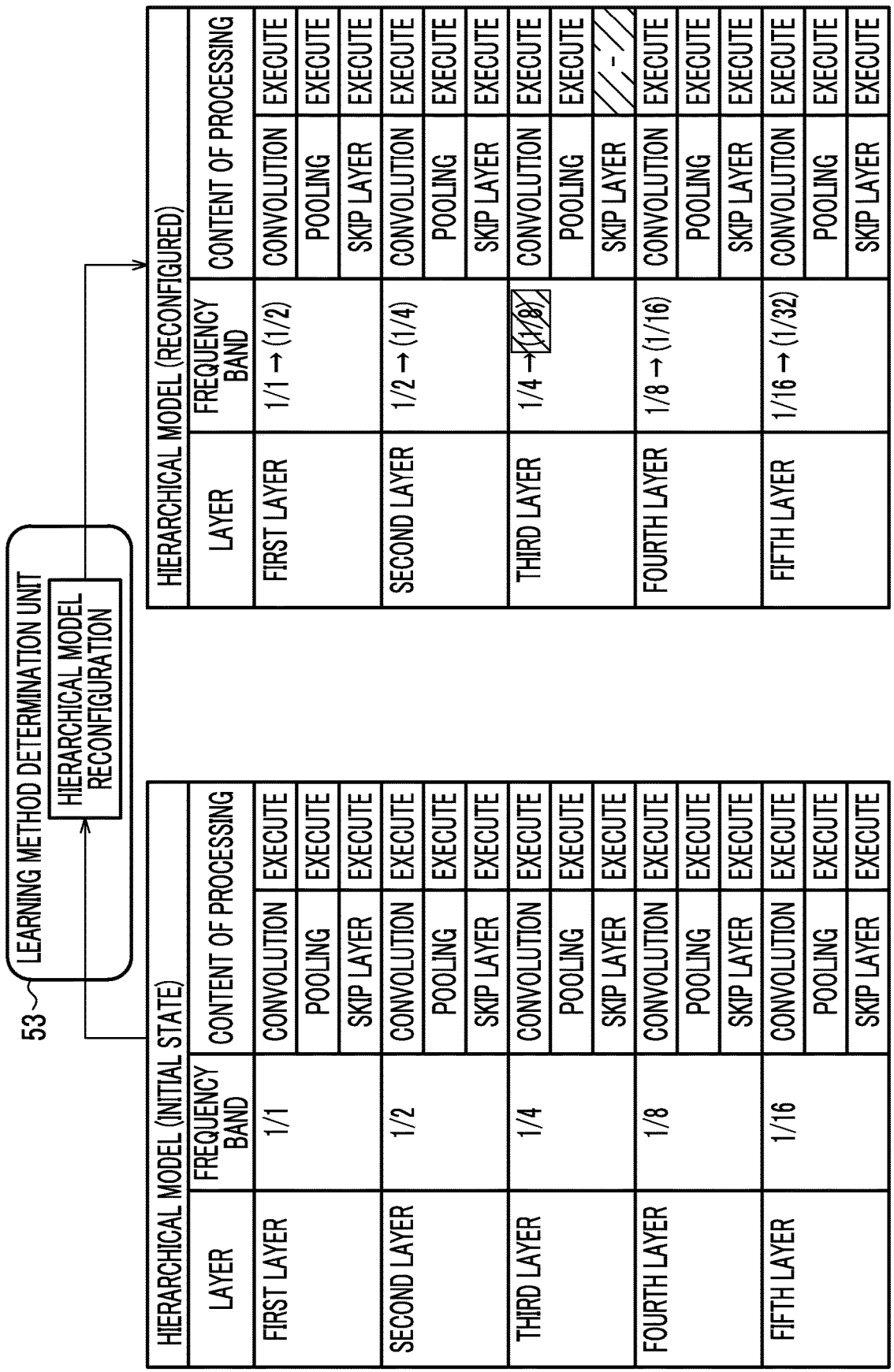
FIG. 28 is a diagram illustrating a specific example of reconfiguration of the hierarchical model according to the third embodiment.

The third embodiment illustrated in FIGS. 26 to 28 is a combination of the first embodiment and the second embodiment. That is, in the third embodiment, in addition to the reconfiguration of the hierarchical model 10, the learning method determination unit 53 determines a learning method of performing correction for lowering the resolution of the learning input image 20S and performing learning.

As illustrated in FIG. 26, the learning method determination unit 53 performs step S1200C illustrated in FIG. 26 as step S1200 illustrated in FIG. 18. In step S1200C, in addition to step S1200A for reconfiguration of the hierarchical model 10 illustrated in FIG. 20, the learning method determination unit 53 performs step S1200B corresponding to the correction for lowering the resolution of the learning input image 20S illustrated in FIG. 23.

FIG. 27 illustrates a specific example in which the learning method determination unit 53 determines a learning method of performing both the reconfiguration of the hierarchical model 10 and the correction for lowering the resolution of the learning input image 20S. In the analysis result 61 illustrated in FIG. 27, similar to the first embodiment, the frequency bands corresponding to the image sizes of 1/1 and ⅛ are determined as "lower than reference", and the other frequency bands are determined as "equal to or higher than reference" and are specified as necessary bands. Further, the frequency band corresponding to the image size of ¹⁄₃₂ is also specified as a necessary band. Similar to the first embodiment, the learning method determination unit 53 determines that the first layer and the fourth layer corresponding to the frequency bands determined as "lower than reference" are optional layers, and determines that the other layers are necessary layers. Further, the hierarchical model 10 does not include a layer which corresponds to the frequency band corresponding to the image size of ¹⁄₃₂. Thus, as illustrated in FIG. 25 according to the second embodiment, the learning method determination unit 53 reduces the image size of the learning input image 20S to ½ by performing correction for lowering the resolution of the learning input image 20S.

As illustrated in FIG. 28, the learning method determination unit 53 reconfigures the hierarchical model 10. In the third embodiment, the learning input image 20S is also corrected, and thus the image size of the learning input image 20S is reduced to ½. Therefore, in the reconfigured hierarchical model 10, the frequency band of the first layer substantially corresponds to the frequency band corresponding to the image size of ½, and the frequency band of the fifth layer substantially corresponds to the frequency band corresponding to the image size of ¹⁄₃₂. As illustrated in FIG. 27, the layer determined as the optional layer is the fourth layer having an analyzable frequency in the hierarchical model 10 in the initial state and corresponds to the image size of ⅛.

As illustrated in FIG. 28, the fourth layer in the hierarchical model 10 in the initial state corresponds to the third layer in the reconfigured hierarchical model 10. The third layer of the hierarchical model 10 is an optional layer, and thus the learning method determination unit 53 partially omits processing of the third layer. In the example illustrated in FIG. 28, only skip layer processing is omitted. In this way, a combination of the first embodiment and the second embodiment may be made.

Fourth Embodiment

In the fourth embodiment illustrated in FIGS. 29 and 30, the learning data analysis unit 52 analyzes the frequency bands included in the learning input image 20S in addition to the annotation image 21S. As illustrated in FIG. 29, the learning data analysis unit 52 performs learning data analysis illustrated in step S1100B. In step S1100B, analysis of the frequency bands of the annotation image 21S from step S1110B to step S1130B is the same as the analysis from step S1110A to step S1130A illustrated in FIG. 19.

In addition to the analysis of the frequency bands included in the annotation image 21S, in step S1140B to step S1160B, the learning data analysis unit 52 analyzes the frequency bands included in the learning input image 20S. The analysis of the learning input image 20S from step S1140B to step S1160B is also performed, for example, by generating an image pyramid, as in the analysis of the annotation image 21S.

As illustrated in FIG. 30, the learning data analysis unit 51 outputs the analysis result 61 of the annotation image 21S and an analysis result 62 of the learning input image 20S.

The learning method determination unit 53 determines a learning method based on the analysis result 61 of the annotation image 21S and the analysis result 62 of the learning input image 20S. For example, in the example illustrated in FIG. 30, in the analysis result 61 of the annotation image 21S, the frequency bands corresponding to the image sizes of 1/1 and ⅛ are determined as "lower than reference", and the other frequency bands are determined as "equal to or higher than reference" and are specified as necessary bands. On the other hand, in the analysis result 62 of the learning input image 20S, only the frequency band corresponding to the image size of ⅛ is determined as "lower than reference", and the frequency band corresponding to the image size of 1/1 is specified as the necessary band.

In this case, in the hierarchical model 10, the learning method determination unit 53 determines that the first layer which corresponds to the frequency band corresponding to the image size of 1/1 is a necessary layer, and determines that only the fourth layer for analyzing the frequency band corresponding to the image size of ⅛ is an optional layer.

As described above, by analyzing the frequency bands included in the learning input image 20S in addition to the annotation image 21S, the following effects can be obtained. That is, as illustrated in FIG. 30, in a case where there is a frequency band which is determined as "lower than reference" in the annotation image 21S and is determined as "equal to or higher than reference" in the learning input image 20S, extraction of features of the frequency band may strongly affect extraction of features of the next layer. The fourth embodiment is effective in such a case, and thus it is possible to appropriately and more reliably determine the class.

The divided small-sized learning input image 20S and the divided small-sized annotation image 21S are used as the learning data. On the other hand, the undivided original learning input image 20 and the undivided original annotation image 21 may be used as the learning data.

In each embodiment, phase-contrast-microscope images in which a state of cell culture appears are exemplified as the input image 16 and the learning input image 20, and the differentiated cells and the medium are exemplified as the classes. On the other hand, the present disclosure is not limited thereto. For example, magnetic resonance imaging (MRI) images may be used as the input image 16 and the learning input image 20, and organs such as a liver and a kidney may be used as the classes.

The hierarchical model 10 is not limited to U-Net, and may be another convolutional neural network, for example, SegNet.

The hardware configuration of the computer including the learning apparatus 2 may be modified in various ways. For example, the learning apparatus 2 may be configured by a plurality of computers which are separated as hardware for the purpose of improving processing capability and reliability. Specifically, the functions of the learning data analysis unit 52, the learning method determination unit 53, and the learning unit 54 may be distributed to three computers. In this case, the learning apparatus 2 is configured by three computers.

In this way, the hardware configuration of the computer may be appropriately changed according to the required performance such as processing capability, safety, and reliability. Further, not only hardware but also the application program 30A such as an operation program may be duplicated or distributed and stored in a plurality of storage devices for the purpose of ensuring safety and reliability.

In each embodiment, for example, as a hardware structure of the processing unit that executes various processing such as pieces of processing by the mini-batch data generation unit 51, the learning data analysis unit 52, the learning method determination unit 53, the learning unit 54, the evaluation unit 56, and the update unit 57, the following various processors may be used. The various processors include, as described above, a central processing unit (CPU) which is a general-purpose processor that functions as various processing units by executing software (an operation program), a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by a combination of two or more processors having the same type or different types (for example, a combination of a plurality of FPGAs or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units via one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

From the above description, the invention described in Appendix 1 below can be understood.

APPENDIX 1

A learning apparatus that inputs learning data to a machine learning model including a plurality of layers for analyzing an input image and learns the machine learning model, the machine learning model being a model for performing semantic segmentation of determining a plurality of classes in the input image in units of pixels by extracting, for each layer, features which are included in the input image and have different frequency bands of spatial frequencies, the learning apparatus including:

a learning data analysis processor that analyzes at least the frequency bands included in an annotation image of the learning data, the learning data being a pair of a learning input image and the annotation image in which each class region included in the learning input image is indicated by an annotation;

a learning method determination processor that determines a learning method using the learning data based on an analysis result of the frequency bands by the learning data analysis processor; and a learning processor that learns the machine learning model via the determined learning method using the learning data.

The technique of the present disclosure can also appropriately combine the various embodiments and the various modification examples. In addition, the technique of the present disclosure is not limited to each embodiment, and various configurations may be adopted without departing from the scope of the present disclosure. Further, the technique of the present disclosure extends to a program and a storage medium for non-temporarily storing the program.

EXPLANATION OF REFERENCES

2: learning apparatus
10: hierarchical model (hierarchical machine learning model)
10A: encoder network
10B: decoder network
10T: learned hierarchical model
11: mini-batch data
12: learning input image group
13: annotation image group
14: learning output image group
14S: learning output image
15: operating apparatus
16: input image 17: output image
20: original learning input image
20S: learning input image
21: original annotation image
21S: annotation image
21SG: blurred image
30: storage device
30A: application program (AP)
31: memory
32: CPU
33: communication unit
34: display
35: input device
36: data bus
51: mini-batch data generation unit
52: learning data analysis unit
53: learning method determination unit
54: learning unit
56: evaluation unit
57: update unit
61, 62: analysis result
ΔP: difference
CMP: image feature map
CNN: convolutional neural network
DI: input data
DIc: output data
F: filter
Icp: pixel
Ip: interest pixel
U: unit

What is claimed is:

1. A learning apparatus comprising:
at least one memory; and
a processor being imported a machine learning model for performing semantic segmentation to determine a plurality of classes in an input image in units of pixels by extracting features which are included in the input image and have different frequency bands of spatial frequencies for each of a plurality of layers for analyzing the input image: wherein
the processor is configured to:
receive a learning data being a pair of a learning input image and an annotation image in which each class region included in the learning input image is indicated by an annotation;
analyze at least a frequency bands included in the annotation image of the learning data;
determine a learning method using the learning input image of the learning data based on a result of the analysis of the frequency bands included in the annotation image of the learning data; and
learn the machine learning model via the determined learning method by inputting the learning input image of the learning data as the input image to the machine learning model.

2. The learning apparatus according to claim 1, wherein the processor is further configured to specify the frequency band for which extraction of the feature is of relatively high necessity among the frequency bands, as a necessary band, by analyzing the frequency bands included in the annotation image, and
reconfigure the machine learning model based on the specified necessary band.

3. The learning apparatus according to claim 2,
wherein, in the reconfiguration, the processor is configured to determine, among the plurality of layers, a necessary layer which is necessary for learning and an optional layer which is optional in learning, based on the specified necessary band, and reduces a processing amount of the optional layer to be smaller than a processing amount of the necessary layer.

4. The learning apparatus according to claim 1, wherein the processor is further configured to specify the frequency band for which extraction of the feature is of relatively high necessity among the frequency bands, as a necessary band, by analyzing the frequency bands included in the annotation image, and
match a range of the frequency bands included in the annotation image with a range of the analyzable frequency bands in the machine learning model, by lowering a resolution of the learning input image based on the specified necessary band.

5. The learning apparatus according to claim 2, wherein the processor is further configured to specify the frequency band for which extraction of the feature is of relatively high necessity among the frequency bands, as a necessary band, by analyzing the frequency bands included in the annotation image, and
match a range of the frequency bands included in the annotation image with a range of the analyzable frequency bands in the machine learning model, by lowering a resolution of the learning input image based on the specified necessary band.

6. The learning apparatus according to claim 3, wherein the processor is further configured to specify the frequency band for which extraction of the feature is of relatively high necessity among the frequency bands, as a necessary band, by analyzing the frequency bands included in the annotation image, and
match a range of the frequency bands included in the annotation image with a range of the analyzable frequency bands in the machine learning model, by lowering a resolution of the learning input image based on the specified necessary band.

7. The learning apparatus according to claim 1, wherein the processor is further configured to analyze the frequency bands included in the annotation image and the learning input image, and
determine the learning method based on a result of the analysis of the annotation image and an analysis result of the learning input image.

8. The learning apparatus according to claim 1, wherein the processor is further configured to generate an image pyramid including a plurality of images which are obtained by gradually lowering the resolution of the annotation image and have different resolutions, and
analyze the frequency bands included in the annotation image based on the image pyramid.

9. The learning apparatus according to claim 1,
wherein the machine learning model is configured with a convolutional neural network including an encoder network and a decoder network,
the encoder network being a network that performs convolution processing of extracting an image feature map representing features which are included in the input image and have different frequency bands by performing convolution computation using a filter, performs pooling processing of outputting the image feature map having a reduced image size by calculating local statistics of the image feature map extracted by the convolution processing and compressing the image feature map, and extracts the image feature map for each layer by repeatedly performing, in the next layer, the convolution processing and the pooling processing on the image feature map which is output in the previous layer and is reduced, the decoder network being a network that generates an output image in which each class region is segmented by repeatedly performing upsampling processing and merging processing, the upsampling processing being processing of, from the minimum-size image feature map which is output in the encoder network, gradually enlarging an image size of the image feature map by upsampling, and the merging processing being processing of combining the image feature map which is gradually enlarged with the image feature map which is extracted for each layer of the encoder network and has the same image size.

10. The learning apparatus according to claim 1, wherein the input image is a cell image in which cells appear.

11. The learning apparatus according to claim 1, wherein the processor is further configured to analyze the frequency bands based on a learning data group including a plurality of pieces of the learning data.

12. A non-transitory computer-readable storage medium storing an operation program of a learning apparatus including a computer being imported a machine learning model including a plurality of layers for analyzing an input image and learns the machine learning model, the machine learning model being a model for performing semantic segmentation of determining a plurality of classes in the input image in units of pixels by extracting, for each layer, features which are included in the input image and have different frequency bands of spatial frequencies, the operation program causing a computer to:

receive a learning data being a pair of a learning input image and an annotation image in which each class region included in the learning input image is indicated by an annotation;

analyze at least a frequency bands included in the annotation image of the learning data;

determine a learning method using the learning input image of the learning data based on a result of the analysis of the frequency bands included in the annotation image of the learning data; and learn the machine learning model via the determined learning method by inputting the learning input image of the learning data as the input image to the machine learning model.

13. An operation method of a learning apparatus including a processor being imported a machine learning model including a plurality of layers for analyzing an input image and learns the machine learning model, the machine learning model being a model for performing semantic segmentation of determining a plurality of classes in the input image in units of pixels by extracting, for each layer, features which are included in the input image and have different frequency bands of spatial frequencies, the operation method comprising:

receiving a learning data being a pair of a learning input image and an annotation image in which each class region included in the learning input image is indicated by an annotation;

analyzing at least a frequency bands included in the annotation image of the learning data:

determining a learning method using the learning data based on a result of the analysis of the frequency bands included in the annotation image of the learning data; and learning the machine learning model via the determined learning method by inputting the learning input image of the learning data as the input image to the machine learning model.

* * * * *